United States Patent
Ezell et al.

(10) Patent No.: US 10,230,801 B2
(45) Date of Patent: Mar. 12, 2019

(54) SESSION RECONSTRUCTION USING PROACTIVE REDIRECT

(71) Applicant: Avaya Inc., Santa Clara, CA (US)

(72) Inventors: Joel M. Ezell, Broomfield, CO (US); Thorsten Ohrstrom Sandgren, Thornton, CO (US); Timothy Ross, Fair Haven, NJ (US); Harsh V. Mendiratta, East Brunswick, NJ (US)

(73) Assignee: Avaya Inc., Santa Clara, CA (US)

( * ) Notice: Subject to any disclaimer, the term of this patent is extended or adjusted under 35 U.S.C. 154(b) by 430 days.

(21) Appl. No.: 14/686,603

(22) Filed: Apr. 14, 2015

(65) Prior Publication Data
US 2016/0308977 A1   Oct. 20, 2016

(51) Int. Cl.
G06F 15/173 (2006.01)
H04L 29/08 (2006.01)
H04L 29/06 (2006.01)

(52) U.S. Cl.
CPC ........ *H04L 67/142* (2013.01); *H04L 65/1006* (2013.01); *H04L 65/1069* (2013.01)

(58) Field of Classification Search
CPC  H04L 67/142; H04L 65/1006; H04L 65/1069
USPC ........................................ 709/224, 227, 203
See application file for complete search history.

(56) References Cited

U.S. PATENT DOCUMENTS

| 6,957,255 B1* | 10/2005 | Schweitzer | H04L 41/0631 709/223 |
| 8,495,231 B1* | 7/2013 | Katapadi | H04L 65/1006 379/201.01 |
| 2007/0174691 A1* | 7/2007 | D'Souza | G06F 11/00 714/13 |
| 2008/0013447 A1* | 1/2008 | Lauber | H04L 65/105 370/225 |
| 2009/0240818 A1* | 9/2009 | Hyndman | H04L 65/4015 709/228 |
| 2010/0138531 A1* | 6/2010 | Kashyap | H04L 65/608 709/224 |

(Continued)

OTHER PUBLICATIONS

Rosenberg, "Discovering Outbound Proxies and Providing High Availability with Client Initiated Connections in the Session initiation Protocol (SIP) draft-rosenberg-sip-outbound-discover-mid-dialog-00," retrieved from http://tools.ietf.org/html/draft-rosenberg-sip-outbound-discovery-mid-dialog-00, 2006, pp. 1-31.

(Continued)

*Primary Examiner* — Philip B Tran
(74) *Attorney, Agent, or Firm* — Sheridan Ross P.C.

(57) ABSTRACT

A method, server, and communication system are described that, among other things, enable a server in a server cluster to assume control of any "early" Session Initiation Protocol (SIP) dialogs previously handled by another server in the server cluster when that server fails or otherwise becomes unable to continue handling a communication session. The replacement server in the server cluster is able to generate one or more messages that include an identification of the dialog identifiers used by the now failed server as well as new dialog identifiers to replace the dialog identifiers used by the now failed server.

23 Claims, 16 Drawing Sheets

(56) References Cited

U.S. PATENT DOCUMENTS

2011/0055627 A1* 3/2011 Zawacki ............... H04L 67/148
  714/15
2014/0047122 A1  2/2014 Haserodt et al.
2015/0058983 A1* 2/2015 Zeitlin ................ H04L 63/1408
  726/23

OTHER PUBLICATIONS

Mahy et al., "The Session Initiation Protocol (SIP) "Replaces" Header," RFC 3891, Network Working Group, Sep. 2004, 15 pages.
Rosenberg et al., "SIP: Session Initiation Protocol," Network Working Group, RFC 3261, Jun. 2002, 188 pages.

* cited by examiner

SESSION RECONSTRUCTION USING PROACTIVE REDIRECT

FIELD OF THE DISCLOSURE

The present disclosure is generally directed toward communications and more particularly toward unified communications and communications in contact centers.

BACKGROUND

Replicating Session Initiation Protocol (SIP) dialog state across multiple servers in a server cluster can be a very expensive proposition, both in terms of processing power and licensing costs. Off the shelf converged containers generally support a clustering offer that has much higher licensing costs than the non-clustered version. Even these expensive clustering solutions often have a failing in being able to handle failovers in the midst of a SIP transaction. This is unfortunate, given that entire self-service interactions and queuing often take place using "early media" in the midst of a SIP transaction. This is especially true in Europe, where regulations exist that demand customers not pay long distance fees until they are talking to a live person.

One illustrative session reconstruction architecture is taught in U.S. Patent Publication No. 2014/0047122, the entire contents of which are hereby incorporated herein by reference. While the '122 publication addresses many of the shortcomings described above, it presents a few shortcomings of its own: (i) it requires a proxy that can alternate route requests and responses based on a fully qualified domain name; (ii) the SIP flow required between the front-end processor and container is somewhat complex; and (iii) the receipt of an incoming SIP message is the only stimulus that can trigger a reconstruction. In the case that the call is queued, however, the stimulus most likely to arrive is one from the agent selection application indicating that an agent is available. An alternate means of session reconstruction is required for this scenario.

SUMMARY

It is, therefore, one aspect of the present disclosure to provide an improved session reconstruction solution. In particular, embodiments of the present disclosure propose a server cluster in which servers in the cluster are able to monitor each others' health using a mechanism like sending SIP OPTIONS messages to one another. Alternatively or additionally, a managing server may be utilized to monitor the health of some or all servers in a cluster.

When it is determined that one of the servers is unresponsive, one of the other servers in the cluster will proactively assume control of any "confirmed" SIP dialogs that had initially been handled by the failed server. This can be done by sending one or more SIP messages (e.g., an INVITE with Replaces) to the connected entity (e.g., a User Agent Client (UAC) of a calling or called entity). In sending this INVITE with Replaces, the standby server is replacing the failed server.

When the INVITE with Replaces is received by the UAC (e.g., a Session Border Controller (SBC), SIP trunk gateway, SIP endpoint, etc), that UAC accepts the INVITE with a 200 OK and one the new dialog is established, will send a BYE on the original INVITE This results in replacing the SIP dialog (signaling) of the failed server with a new SIP dialog (signaling) to the replacement server.

In addition to being configured to take over "confirmed" SIP dialogs, a server in a server cluster may also be configured to take over "early" SIP dialogs that were being handled by a failed server. An "early" SIP dialog corresponds to a dialog of a communication session that has not been established between two endpoints, but instead an IVR or a similar media element is providing early media to a calling entity. Taking over an "early" SIP dialog can be done by sending one or more SIP redirect responses (e.g., 301/301 messages) to the calling entity (e.g., a UAC of the caller). In sending this redirect response, the replacement server is impersonating the failed server. The Contact address in the 3xx response may contain the originally called address, but the Contact Uniform Resource Identifier (URI) parameters would be added that allow one of the surviving members of the cluster to reconstruct the feature state of the original dialog on the server handling the new, replacement dialog.

When the 3xx response is received by the calling entity's UAC, that UAC will send a CANCEL on the original INVITE and will then send a new INVITE to the address specified in the Contact header of the 3xx response. This new INVITE will get directed by the proxy/load balancer to one of the surviving members of the cluster. The recipient server will note the presence of the session reconstruction URI parameters and will reconstruct the session using this information as well as information that would have been stored in a shared memory or database store.

Advantageously, the solutions proposed herein avoid the computational overhead and licensing costs of traditional converged container clusters. Additionally, the proposed solutions work well for mid-transaction failovers in addition to working well when a non-SIP stimulus (e.g. contact center agent becoming available) triggers the reconstruction.

In some embodiments, a secondary server in a server cluster is enabled to impersonate a failed server, instructing a UAC to initiate a new session including session reconstruction data in the URI parameters that will allow a surviving server to reconstruct the session state.

In some embodiments, a communication method is provided that generally comprises:

receiving an indication that a first server in a server cluster has failed or otherwise become unable to continue servicing at least one call that was previously being serviced by the first server prior to the failure of the first server;

in response to receiving the indication, generating a message at a second server in the server cluster that contains information enabling the second server to impersonate the first server; and transmitting the message to a User Agent Client (UAC) to initiate a new session, wherein the information contained in the message enables the new session to have reconstructed session state from the at least one call that was previously being serviced by the first server prior to the failure of the first server.

The term "communication session" as used herein refers to any communication or set of communications between communication devices, whether including audio, video, text, or other multimedia data. Typically, a communication session includes two or more communication endpoints, UAs, and/or one or more communication servers (e.g., a SIP server).

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000 and RFC 3891, which is also available from the IETF Network Working Group, September 2004; these documents and all other documents describing SIP are hereby incorporated by reference in their entirety for all that they teach.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "network" as used herein refers to a system used by a communication platform to provide communications between communication endpoints. The network can consist of one or more user relation elements, feature servers, communication endpoints, etc. that allow communications, whether voice or data, between two users. A network can be any network or communication system as described herein below. Generally, a network can be a local area network (LAN), a wide area network (WAN), a wireless LAN, a wireless WAN, a Voice over IP (VoIP) network, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database," "archive," or "data structure" as used herein refers to any system, hardware, software, memory, storage device, firmware, component, etc., that stores data. The data model can be any type of database or storage framework, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

It should be appreciated that embodiments of the present disclosure can be utilized in numerous conferencing environments such as video conferencing environments, audio conferencing environments, multi-media conferencing environments, etc.

Furthermore, while the illustrative embodiments herein show the various components of a system collocated, it is to be appreciated that the various components of the system can be located at distant portions of a distributed network, such as a communication network and/or the Internet, or within a dedicated secure, unsecured, and/or encrypted system. Thus, it should be appreciated that the components of the system can be combined into one or more devices, such as an enterprise server or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof.

Figure 1:
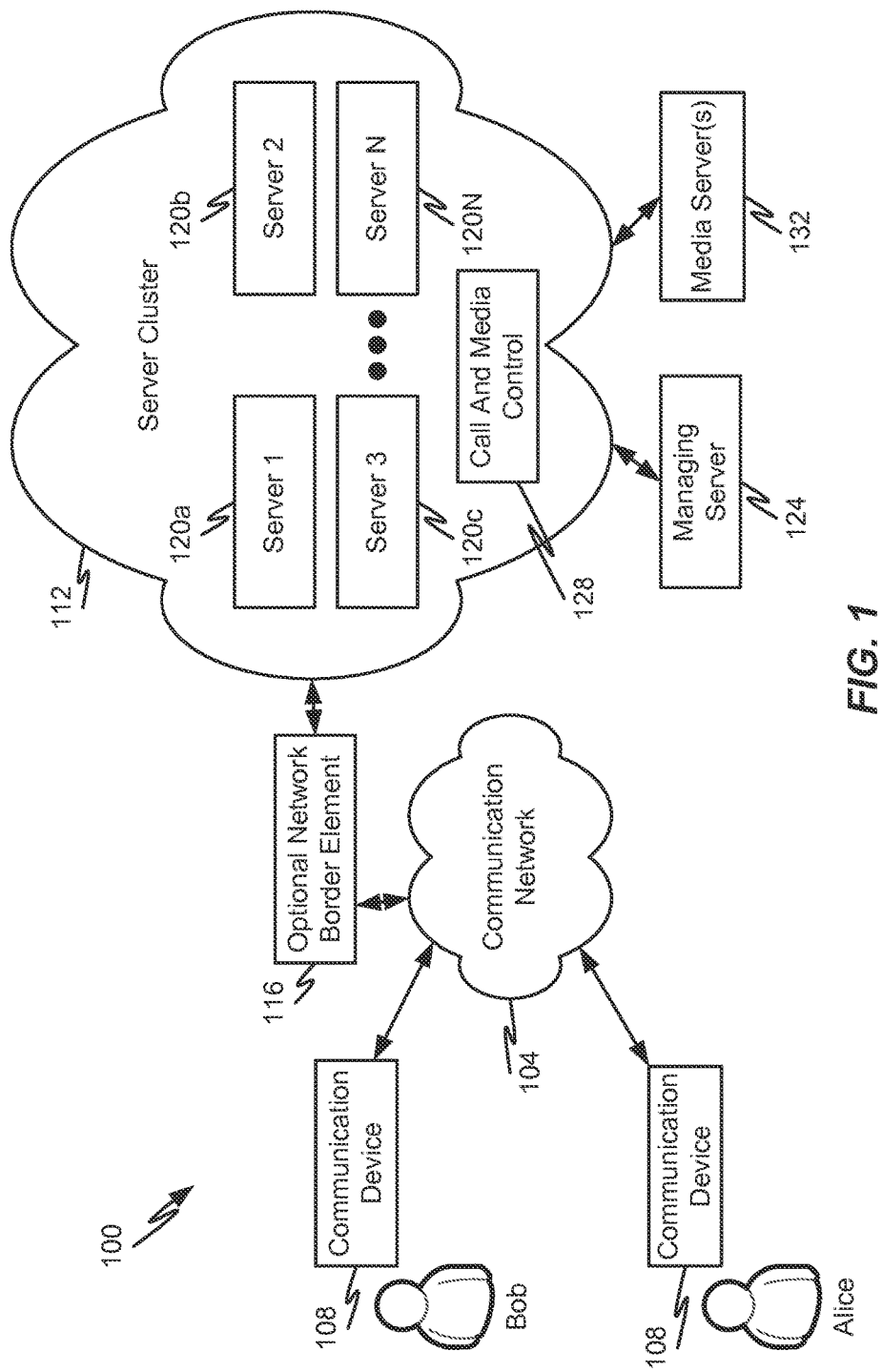
FIG. 1 is block diagram depicting a communication system in accordance with embodiments of the present disclosure.

With reference initially to FIG. 1, an illustrative communication system 100 will be described in accordance with at least some embodiments of the present disclosure. The system 100 is shown to include a communication network 104 that enables communications between one or more communication devices 108. In addition to enabling communications between communication devices 108, the communication network 104 may also enable the communication devices 108 to connect to other communication elements (e.g., servers) that provide services in connection with a communication session between communication devices 108. In some embodiments, the communication network 104 may be packet-switched and/or circuit-switched. An illustrative communication network 104 includes, without limitation, a Wide Area Network (WAN), such as the Internet, a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 104 is a public network supporting the TCP/IP suite of protocols. The communication network 104 may alternatively or additionally include one or more private networks, for instance a Local Area Network (LAN), a series of LANs connected by one or more WANs, a Virtual Private Network (VPN), a Peer-to-Peer (P2P) network, a proximity-based network (e.g., a network established using 802.11x protocols). For instance, the communication network 104 may include an enterprise communication network whose security is maintained with internal policies and firewalls. The depiction of a generic communication network 104 is for ease of understanding the details of the present disclosure and is not intended to limit the scope of the claims to a single network.

The communication devices 108 may correspond to devices that are connected directly to and are a part of a private network (e.g., enterprise communication devices) or they may correspond to devices connected to a public communication network. Illustrative types of communication devices 108 include, without limitation, cellular phones, smartphones, laptops, tablets, Personal Computers (PCs), Personal Digital Assistants (PDAs), digital phones, analog phones, softphones, or any other endpoint capable of having a UAC operating thereon or being a UAC itself.

In some embodiments, one or more servers 120a-N may be connected to the communication network 104. The servers 120a-N may be considered part of a collection of servers maintained using common maintenance protocols, such as a server cluster 112. The servers 120a-N in the server cluster 112 may be connected directly to the communication network 104, for instance if the communication network 104 is an enterprise communication network or some other type of private communication network. Alternatively or additionally, the servers 120a-N in the server cluster 112 may be connected to a public communication network 104 via an optional network border element 116, that helps ensure security for the server cluster 112 from attacks via the communication network 104. The network border element 116 may correspond to any type of network boundary device that resides between two networks. The network border element 116 may include or have the functionality of a gateway, a firewall, or the like. The network border element 116 may alternatively or additionally provide network translation services between the communication network 104 and the server cluster 112.

The servers 120a-N in the server cluster 112 may correspond to one or multiple servers capable of providing one or more services to a communication session. When involved in a communication session (e.g., by virtue of being sequenced into a signaling path, a media path, or both), a server may be configured to provide one or more services such as call recording services, early media services, caller ID services, conferencing services, collaboration services, a mobility services, presence services, and any other type of feature that can supplement or enhance communications between communication devices 108 or between one communication device and an automated resource, such as an Interactive Voice Response (IVR) system.

In some embodiments, the server cluster 112 may also have one or more other servers or components connected thereto or included therein that help the functionality of the server cluster 112. In particular, the server cluster 112 may include a managing server 124 and/or a call and media control server 128 that can help to coordinate the operations of various servers 120a-N within the server cluster 112. Said another way, the servers 120a-N depicted in the server cluster represent redundant instances of similar or identical servers that are capable of providing the same or similar services to a communication session. In a High Availability (HA) environment, the servers 120a-N may be configured to fill in for failed servers within the server cluster 112, thereby making the services offered by one server highly available due to the redundant availability of other servers. Some or all of the servers 120a-N may be collocated (e.g., at a common physical location). In other embodiments, some of the servers may be separated by other servers in the cluster 112 by some distance and a communication network 104, thereby providing redundancy in the event that one location of servers becomes unavailable due to an event at that location. A cluster 112 may comprise as few as two servers 120 and there is practically no limit to the number of servers 120 that may be included in a cluster 112.

As will be discussed in further detail herein, a managing server 124 is configured to manage the efforts of the servers in the cluster 112, especially when responding to a server failure. In particular, the managing server 124 may be configured to select one of the servers from the cluster to take over for a failed server, thereby ensuring that two servers do not simultaneously attempt to take over for a failed server. In some embodiments, the managing server 124 may only need to inform one or more servers 120 in the server cluster 112 that one of their peer servers has gone down, at which point the surviving servers 120 may coordinate amongst themselves which server 120 will take over for the failed server. In some embodiments, the managing server 124 may or may not be necessary to coordinate the efforts of the servers 120 in the server cluster 112. For instance, the surviving servers in a cluster 112 may utilize a self-selecting mechanism to take over calls for a failed server in the cluster 112. A locking mechanism may be utilized in a shared datagrid or a centralized highly available database to ensure that multiple servers cannot try to simultaneously take over the same call. Thus, once a first server in the cluster 112 begins the process of taking over for a failed server, the locking mechanism may be invoked in the datagrid, thereby prohibiting other servers from taking further actions.

Figure 2:
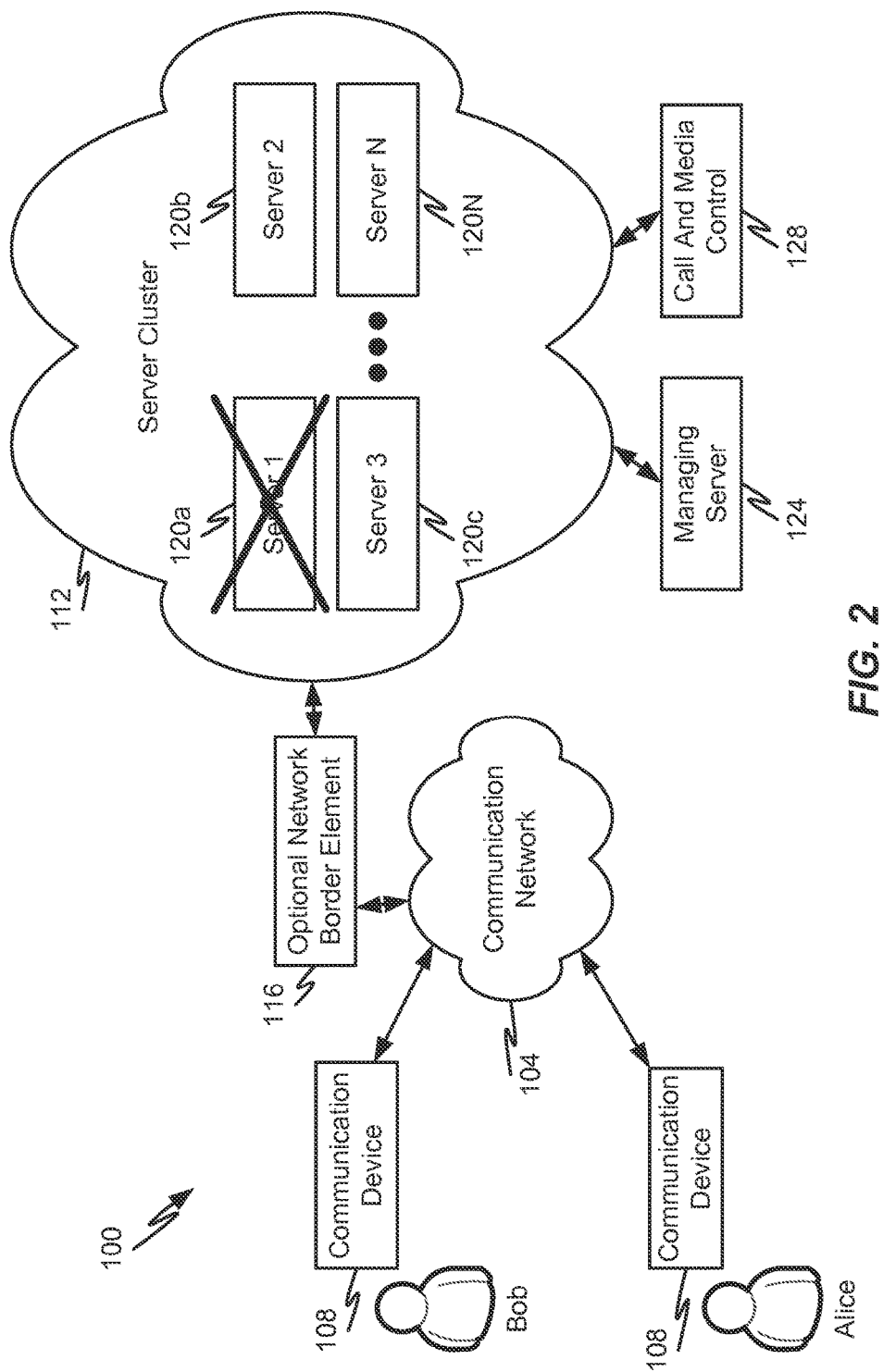
FIG. 2 is a block diagram depicting the communication system of FIG. 1 with a failed or otherwise unavailable server in accordance with embodiments of the present disclosure.

The call and media control functionality 128 may be configured to synchronize or otherwise manage behaviors of the servers in the cluster 112. The call and media control functionality 128 may be implemented as a stand-alone server in the cluster 112 or as functionality within some or all of the servers 120a-N in the server cluster 112. In some embodiments, the call and media control functionality may include a shared datagrid or a highly available centralized database to which all servers 120a-N have access. The call and media control functionality 128 may enable the servers 120a-N to know when another peer server has begun the process of taking over for a failed server, thereby ensuring that no more than one server 120 attempts to take over for a failed server at a time. In some embodiments, the call and media control functionality 128 may be configured to retrieve and store various information related to in-progress sessions (e.g., SIP dialog-IDs, server IDs, connection IDs, associated media server IDs involved in a communication session, and the like. As will be discussed herein, the call and media control functionality 128 may be configured to identify and store certain parameters or properties associated with in-progress communication sessions and their dialogs such that the dialogs can be persisted in the event of a server failure, like is shown in FIG. 2. The call and media control functionality 128 may be positioned inside the server cluster 112 (e.g., as functionality of servers 120a-N) or outside the server cluster 112.

FIG. 1 also depicts one or more media servers 132 that are capable of providing media services to communication sessions. The media server(s) 132 may include any type of known media server capable of providing or bridging media (e.g., voice, video, data) during a communication session. Examples of media server(s) 132 include, without limitation, IVR servers, voice conference bridges, video conference bridges, etc.

High availability of the servers 120a-N allows full call control and media to continue for a communication session even if one of the servers 120 originally serving the call is unable to provide the service for that call. While media does not terminate on a server 120, a server taking over for a failed server on a call will also be enabled to re-establish the media path for the call. In some embodiments, only servers in the cluster 112 are allowed to take control over an existing call from another server in the same cluster 112. In other words, servers outside the cluster 112 will not be able to take control over a call that was previously handled by a server inside the cluster 112.

High availability is used to preserve the end-to-end signaling path such that SIP messages can be exchanged. SIP messages that are in-flight before the INVITE with Replaces or 3xx response has been sent will be lost and may cause the dialog to be torn down. Without high availability, simple operations such as answering a call or hold/unhold will not be signaled to peer snap-in or endpoints involved in the call. The inability to answer a call is of particular concern to a call center. Consider the scenario where a caller is in queue listening to music, and being reminded every so often that the call is of the utmost importance to the called company. If the server 120 handling the music-on-hold suffers some catastrophic event while the customer is listening to music, then problems will arise when a call center agent is selected for assignment to the call. In particular, the call center agent will not be connected to the failed server. To make matters worse, since the server is failed or otherwise unavailable, there is no event sent to stop sourcing music to the customer. The end result is that the customer hears music but the call is lost within the call center for all intents and purposes.

Employment of servers 120 in a cluster 112 enables a contact center to avoid the situation and others. Likewise, deployment of the cluster 112 in non-contact center environments also helps users to avoid similar issues. In some embodiments, a server 120 within the same cluster 112 as a failed server can be selected by the managing server 124 to handle session reconstruction in the form of a "new call." This newly selected server is referred to as the owner of that particular call. This designation is due to the fact that the server 120 does not share SIP context or snap-in contexts among the other servers 120 in the cluster 112. In other words, servers 120a-N in the cluster 112 have no knowledge of SIP-related attributes on other servers 120a-N in the same cluster.

Since a server 120 cannot signal SIP messages on behalf of a call it does not own, the replacement server 120 must first take control of the call to become the owner of the call. In some embodiments, and as will be described in further detail herein, the server achieves this by sending an INVITE with Replaces or 3xx message to the dialog(s) it wishes to take over.

Figure 3:
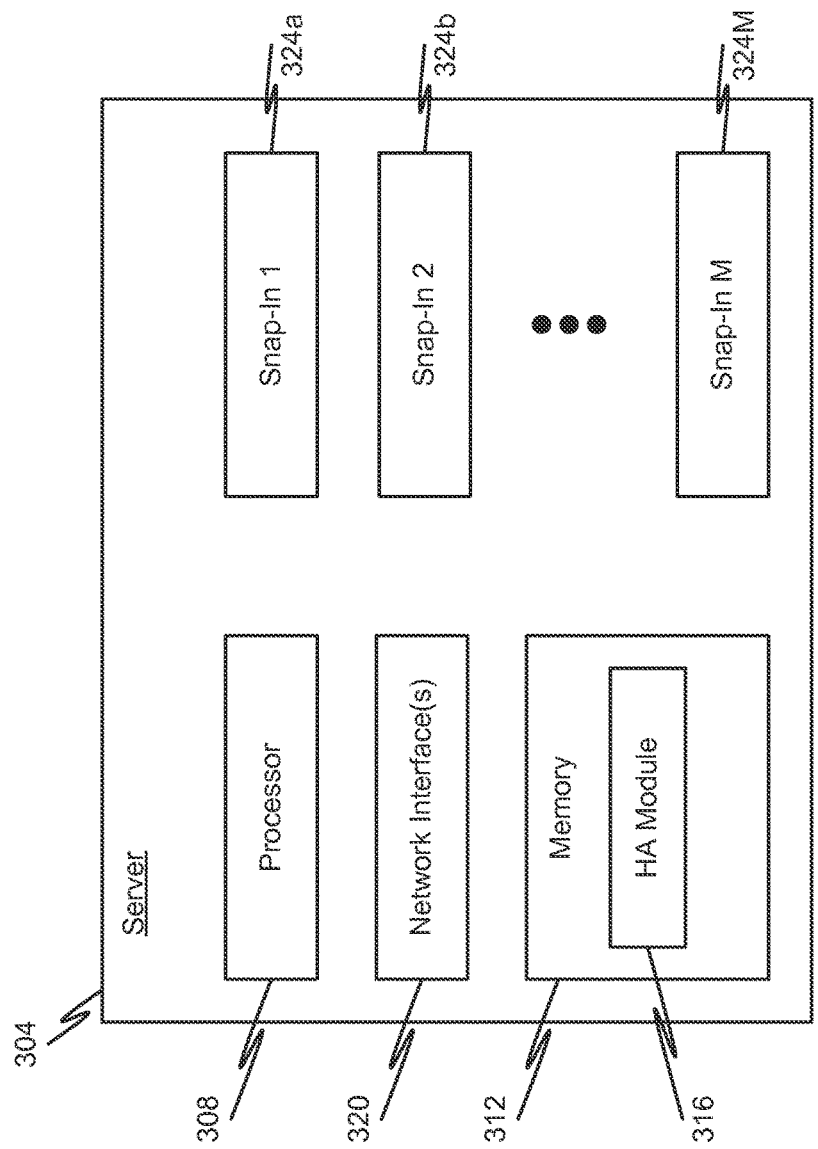
FIG. 3 is a block diagram depicting details of a server in accordance with embodiments of the present disclosure.

With reference now to FIG. 3, additional details of a server 304 will be described in accordance with at least some embodiments of the present disclosure. The server 304 may correspond to any one of the servers 120 in a cluster 112 and is provided for illustrative purposes only. The server 304 is shown to include a processor 308, memory 312, one or more network interfaces 320, and one or more snap-ins 324a-M.

The processor 308 may correspond to one or multiple processors or controllers that are known for use in servers 304 and similar computational components. The processor 308 may correspond to a microprocessor in some embodiments and may be configured to execute computer-readable instructions stored in memory 312, thereby facilitating any of the behaviors of a server 304 described herein. In other embodiments, the processor 308 may include one or more Integrated Circuit (IC) chips.

The memory 312 may include any type of non-transitory computer-readable memory that is either volatile or non-volatile in nature. The memory 312 may include types of computer memory like FLASH memory, RAM, ROM, PROM, EEPROM, or the like. In the depicted embodiments, the memory 312 includes instructions in the form of an HA module 316. When executed by processor 308, the HA module 316 may facilitate the HA behavior of the server 304 in the cluster 112. In particular, the HA module 316 may be responsible for enabling a server 304 to take over a session for a failed server in the same cluster 112 as server 304 and the HA module 316 may also include instructions that enable the server 304 to properly reconstruct session state information for dialogs.

The network interface(s) 320 may include any type of computing interface that enables device-to-device communications. In some embodiments, the network interface 320 may correspond to a direct communication interface (e.g., Bluetooth, USB, etc.). In other embodiments, the network interface 320 may correspond to an interface that enables the server 304 to communicate over the communication network 104. Non-limiting example of the network interface 320 include an Ethernet port, an 802.11x interface, a cellular interface, a serial communication interface, or the like.

The snap-ins 324a-M may correspond to processing subcomponents of the server 304 that provide specific call features or functions when integrated in a communication session. For instance, a snap-in 324 may correspond to an applet or container in a virtual machine that can be sequenced into an application sequence or dialog, thereby enabling the snap-in 324 to provide call features or functions to a communication session. In some embodiments, the snap-ins 324a-M may be configured to be sequenced into an application sequence of a communication session as a Back-to-Back User Agent (B2BUA).

Figure 4A:
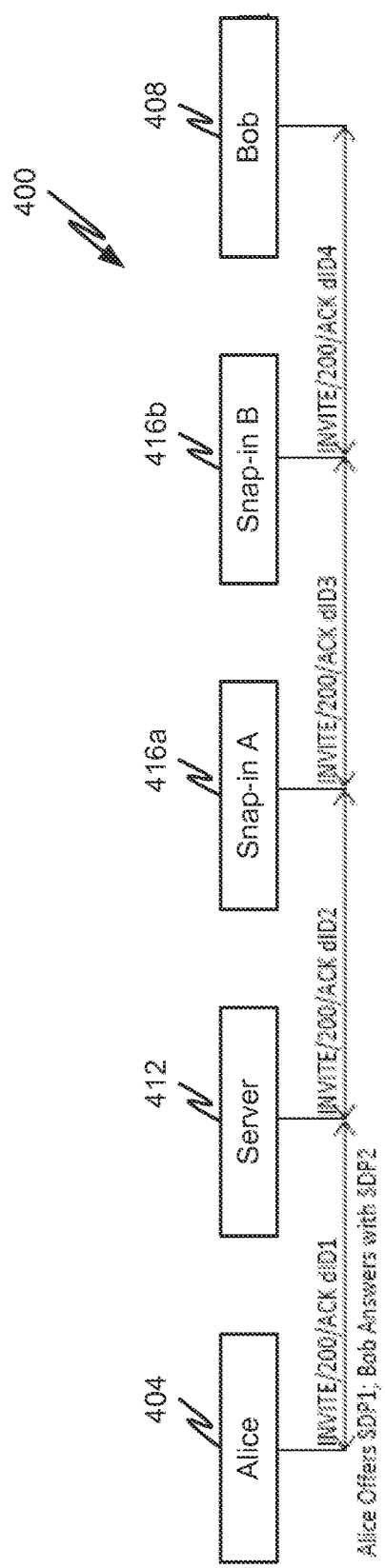
FIG. 4A is a diagram depicting messaging flows for a communication session between Alice and Bob in accordance with embodiments of the present disclosure.
Figure 4B:
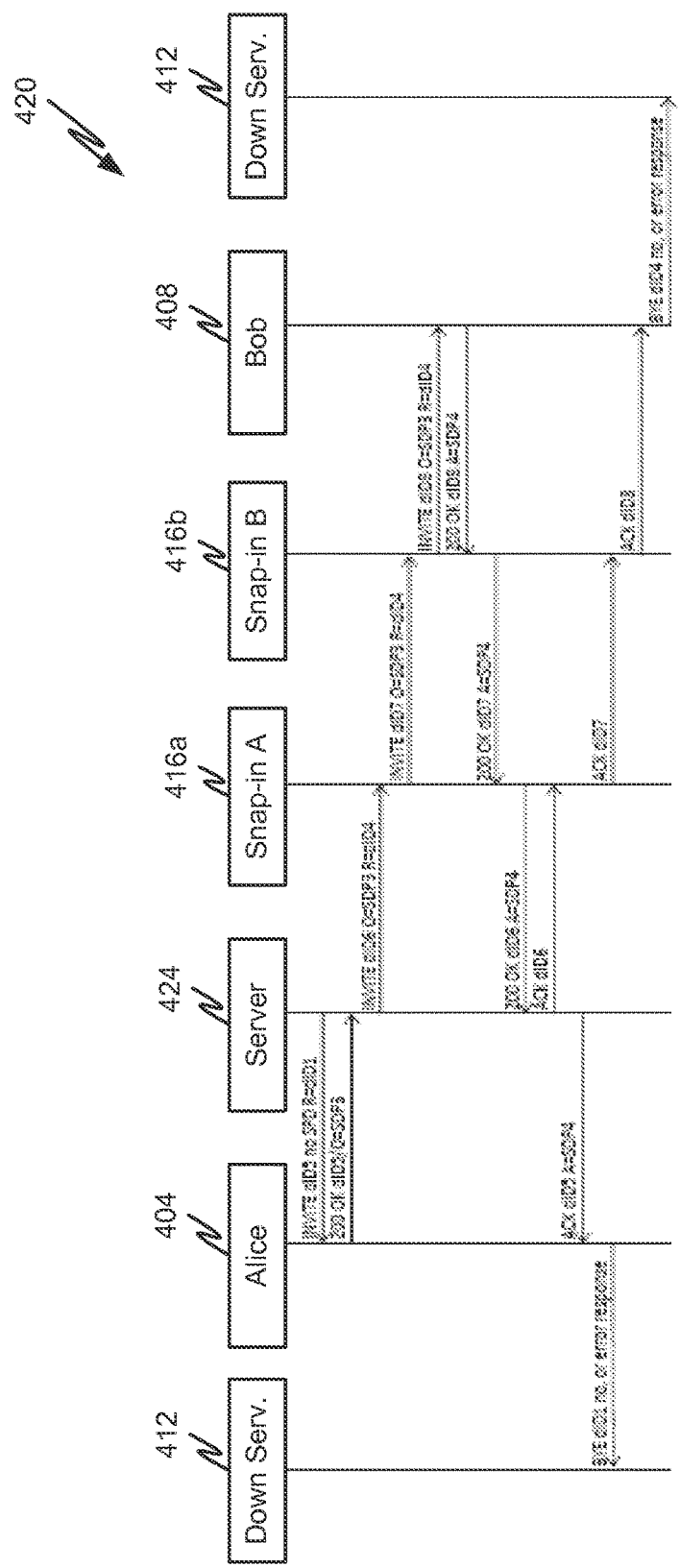
FIG. 4B is a diagram depicting a server-initiated session reconstruction method for the communication session depicted in FIG. 4A.
Figure 4C:
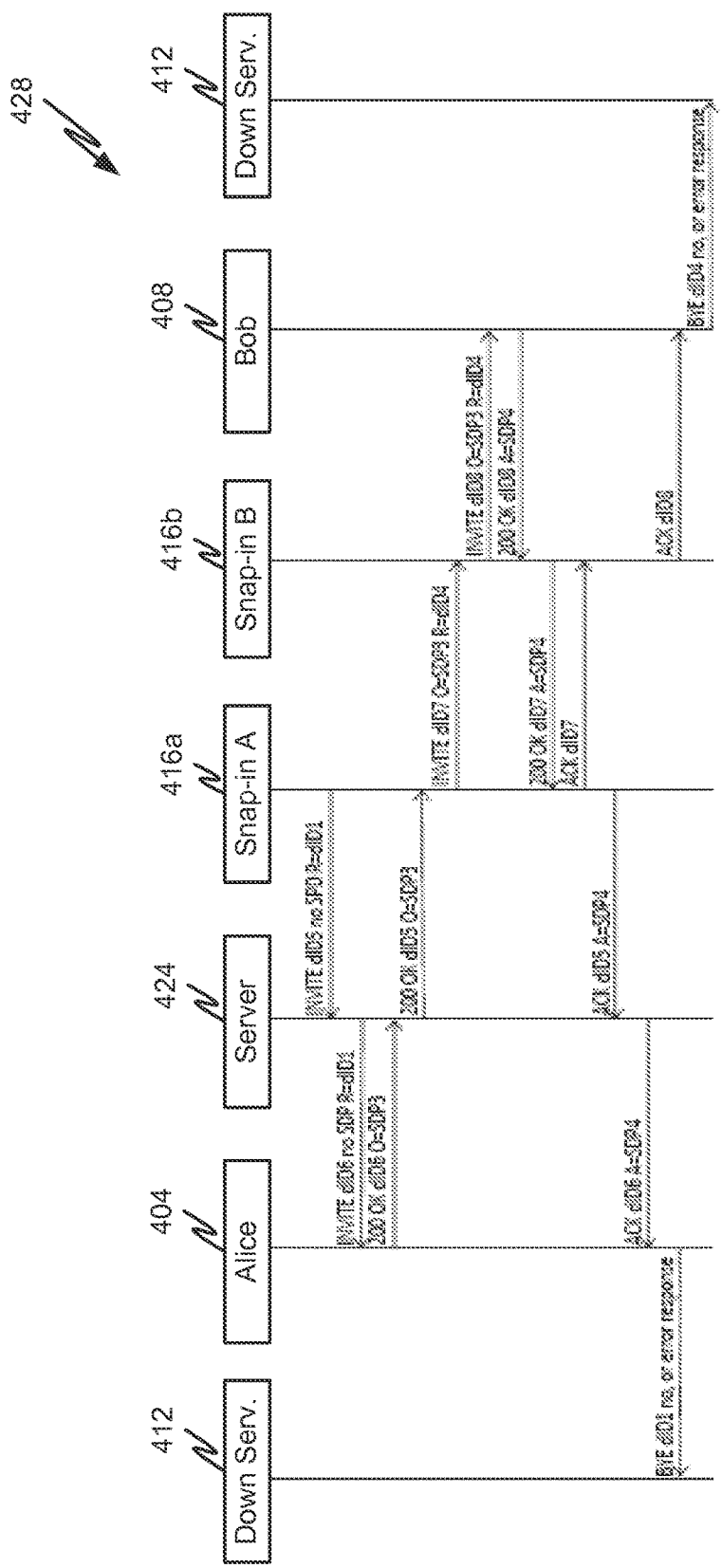
FIG. 4C is a diagram depicting a snap-in-initiated session reconstruction method for the communication session depicted in FIG. 4A.

With reference now to FIGS. 4A-4C, details of a first type of communication session and methods of reconstructing the same will be described in accordance with at least some embodiments of the present disclosure. With initial reference to FIG. 4A a diagram depicting messaging flows 400 for a communication session between Alice 404 and Bob 408 in accordance with embodiments of the present disclosure. The initial set-up of a call between Alice 404 and Bob 408 include Alice 404 first sending an INVITE toward Bob 408 with a first dialog ID ("dID1"). Alice 404 offers a first SDP ("SDP1") that is transmitted to Bob 408 via the server 412 and one or more snap-ins 416a, 416b. Although only two snap-ins 416a, 416b are depicted in FIG. 4A, it should be appreciated that more or fewer snap-ins can be used without departing from the scope of the present disclosure.

The INVITE transmitted by Alice 404 is received at server 412, which forwards the INVITE to the first snap-in 416a, but with a second dialog ID dID2. The second dialog ID dID2 represents the leg of the dialog between the server 412 and first snap-in 416a. The first snap-in 416a forwards the INVITE to the second snap-in 416b, but with a third dialog ID dID3. The third dialog ID dID3 represents the leg of the dialog between the first snap-in 416a and the second snap-in 416b. Once all necessary snap-ins have been sequenced into the dialog (e.g., by receiving the INVITE), the INVITE message is transmitted to Bob 408. In the depicted example, the INVITE message transmitted to Bob 408 includes a fourth dialog ID dID4.

Bob 408 responds to the INVITE with a 200 OK message. The 200 OK message travels the same path as the INVITE message, but in reverse, and includes a second SDP SDP2. The second SDP SDP2 is ultimately received by Alice 404. Now that Alice 404 and Bob 408 have SDP information for one another, the communication session can be established between Alice 404 and Bob 408. Optionally, Alice 404 can respond to the 200 OK message with an ACK or similar type of SIP response. Once all of the initiation messages have been exchanged, Alice 404 and Bob 408 are allowed to engage in a communication session using snap-ins 416a, 416b and server 412.

With reference now to FIG. 4B, a first example message flow 420 for recovering from server 412 failing during the communication session established in FIG. 4A will be described in accordance with at least some embodiments of the present disclosure. The recovery of FIG. 4B is initiated by server 424, which is replacing server 412 that was originally involved in the communication session between Alice 404 and Bob 408. The replacement server 424 and failed server 412 may both correspond to servers from a common server cluster 112. The server 424 may initiate the dialog reconstruction in response to detecting that server 412 has failed or in response to one or more instructions received from a managing server 124.

To initiate the dialog reconstruction for failed server 412, the replacement server 424 transmits an INVITE message to Alice 404. The INVITE message may contain a fifth dialog ID dID5 (something different than a dialog ID used in constructing the initial communication session). The INVITE transmitted to Alice 404 also contains no SDP information. The INVITE transmitted to Alice 404 also contains instructions to replace the first dialog ID dID1 that was used to create the initial communication session. In some embodiments the INVITE message transmitted from server 424 to Alice 404 may correspond to an INVITE with Replaces.

In response to receiving the INVITE with Replaces, Alice 404 generates and transmits a 200 OK message with the fifth dialog ID dID5 as well as a new SDP offer (e.g., the 200 OK message may contain third SDP information SDP3). This new SDP information will replace the previous SDP information used during initial construction of the communication session.

The server 424 receives the 200 OK message and generates a corresponding INVITE on behalf of Alice 404. The INVITE message is transmitted to the first snap-in 416a and contains a sixth dialog ID dID6 along with the third SDP information SDP3 received from server 424. Additionally, the INVITE message contains the fourth dialog ID dID 4 in the Replaces header. The first snap-in 416*a* generates an INVITE message for transmission to the second snap-in 416*b*, which contains the third SDP information, a seventh dialog ID dID7, as well as the fourth dialog ID dID4 in the Replaces header. Thus, as can be seen in the flow 420, the fourth dialog ID dID 4 (which corresponds to the dialog ID known to Bob 408) persists in the Replacement header of each INVITE traveling from server 424 to Bob 408. The information in the Replaces header enables Bob 408 to know which dialog ID will be replaced with a new dialog ID.

The message flow 420 continues with the second snap-in 416*b* transmitting an INVITE with Replaces message to Bob 408 that contains an eighth dialog ID dID8, the third SDP information, and the fourth dialog ID dID4 in the Replaces header. Upon receiving the INVITE with Replaces message, Bob 408 now knows that the fourth dialog ID dID4 is to be replaced with the eighth dialog ID dID8. This results in Bob 408 generating a 200 OK message that includes new SDP answer information (e.g., fourth SDP information). The SDP answer containing the fourth SDP answer information is passed back through the snap-ins 416*a*, 416*b* and then to the server 424. The server then responds by sending two ACK messages, one to the first snap-in 416*a* and one to Alice 404. Each ACK message contains the relevant dialog ID information for that leg of the call. Moreover, the ACK transmitted to Alice 404 contains the SDP answer information (e.g., fourth SDP information), thereby enabling Alice 404 to have the SDP information transmitted by Bob 408. Upon receiving the ACK message, Alice 404 transmits a BYE message with the first dialog ID dID1 to the failed server 412. Likewise, when the other ACK message is received by Bob 408, Bob 408 will transmit a BYE message with the fourth dialog ID dID4 to the failed server 412. At this point the server 424 has replaced the failed server 412 and reconstructed the dialog between Alice 404 and Bob 408.

In some embodiments, the snap-ins 416*a*, 416 do not need to know the difference between a regular INVITE request and one for session reconstruction purposes. Moreover, the source of the take-over INVITE (e.g., the server 424) may need to add a private header (e.g., a P-av-takeover) to indicate the take-over.

With reference now to FIG. 4C, a second example message flow 428 for recovering from server 412 failing during the communication session established in FIG. 4A will be described in accordance with at least some embodiments of the present disclosure. The recovery of FIG. 4C is initiated by a snap-in 416*a* instead of the replacement server 424. As with the recovery method described in FIG. 4B, the replacement server 424 and failed server 412 may both correspond to servers from a common server cluster 112. The snap-in 416*a* may initiate the dialog reconstruction in response to detecting that server 412 has failed or in response to one or more instructions received from a managing server 124.

The session reconstruction flow 428 is similar to the flow 420 except that the initial INVITE with Replaces is transmitted from the first snap-in 416*a* to the replacement server 424. In response to receiving the INVITE with Replaces, the replacement server 424 generates an INVITE with Replaces that contains the first dialog ID dID1 in the Replaces header and no SDP information. The INVITE with Replaces transmitted by the server 424 also includes a sixth dialog ID dID6 as opposed to a fifth dialog ID dID5 as in message flow 420. Upon receiving the INVITE with Replaces from the server 424, Alice 404 generates a 200 OK message containing the new SDP offer. The new SDP offer (e.g., the third SDP information) is transmitted to Bob 408 via the server 424 and snap-ins 416*a*, 416*b*. Upon receiving the INVITE with Replaces having the new SDP offer information, Bob 408 responds with a 200 OK message containing a new SDP answer (e.g., the fourth SDP information). This new SDP answer is transmitted back toward the first snap-in 416*a* along with the 200 OK message. When the first snap-in 416*a* receives the 200 OK message, the first snap-in 416*a* transmits two ACK messages, one toward Bob 408 and the other toward Alice 404 via the server 424. The ACK message transmitted toward Alice 404 contains the new SDP answer. When Alice 404 receives the new SDP answer, Alice 404 transmits a BYE message to the now failed server 412. Likewise, when Bob 408 receives the ACK message, Bob 408 transmits a BYE message to the now failed server 412. This causes the original session hosted by server 412 to be reconstructed with server 424. Moreover, because new dialog IDs have been shared among the entities involved in the original communication session (e.g., the snap-ins), there is the possibility of reconstructing dialog and state information for the communication session.

Similar to message flow 420, the snap-ins 416*a*, 416 do not need to know the difference between a regular INVITE request and one for session reconstruction purposes. Moreover, the source of the take-over INVITE (e.g., the snap-in 416*a*) may add a private header (e.g., a P-av-takeover) to indicate the take-over. In other situations, it may be good for the snap-ins to know the difference between a regular INVITE request and one for session reconstruction purposes. Some of the call processing logic that is done at establishment of a new call may not be desirable for reconstructions. Additionally, the snap-ins may want to treat the reconstructed call as a continuation of the previous call if doing call detail recording or the like.

Figure 5A:
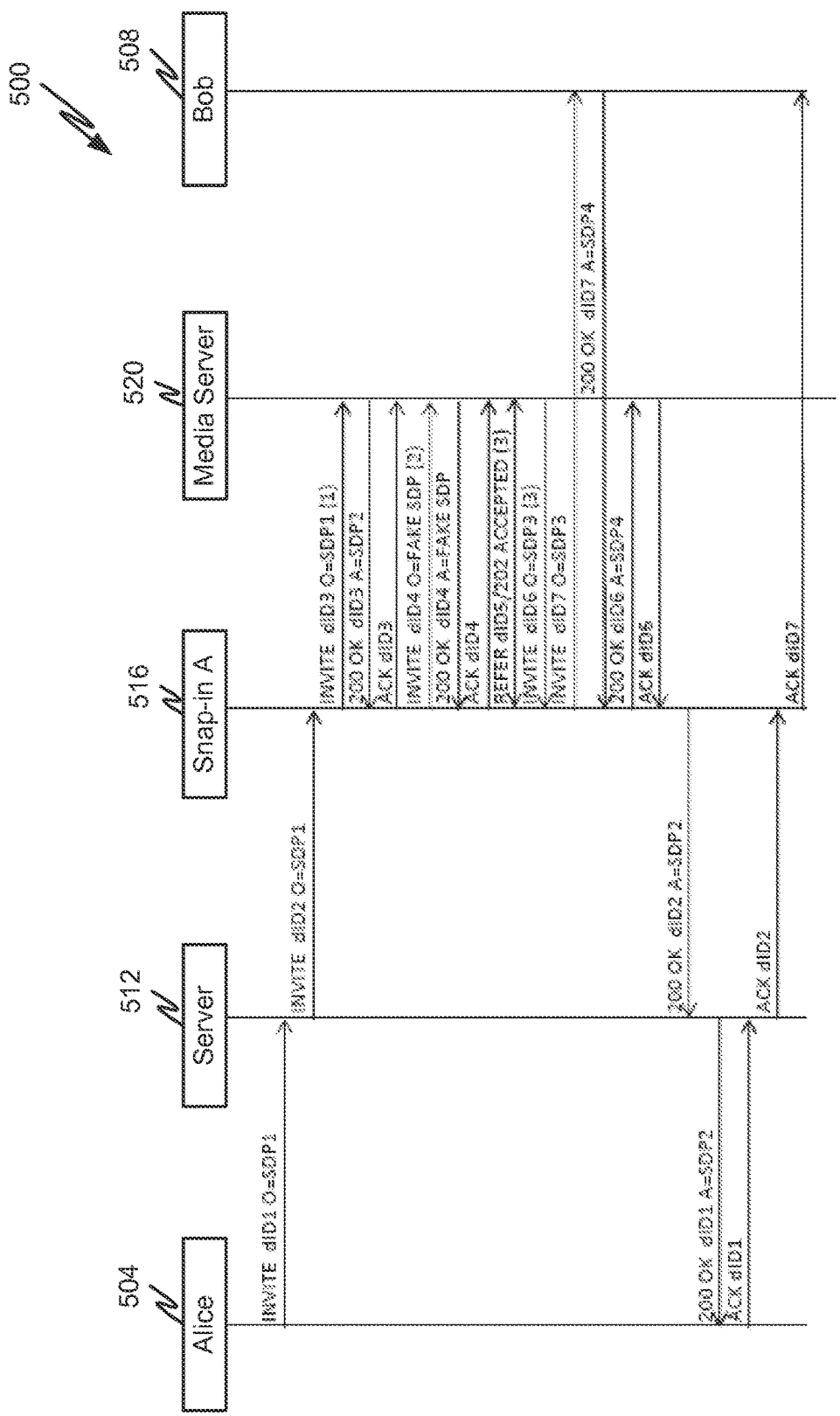
FIG. 5A is a diagram depicting messaging flows for a communication session between Alice and Bob with a media server included therein in accordance with embodiments of the present disclosure.
Figure 5B:
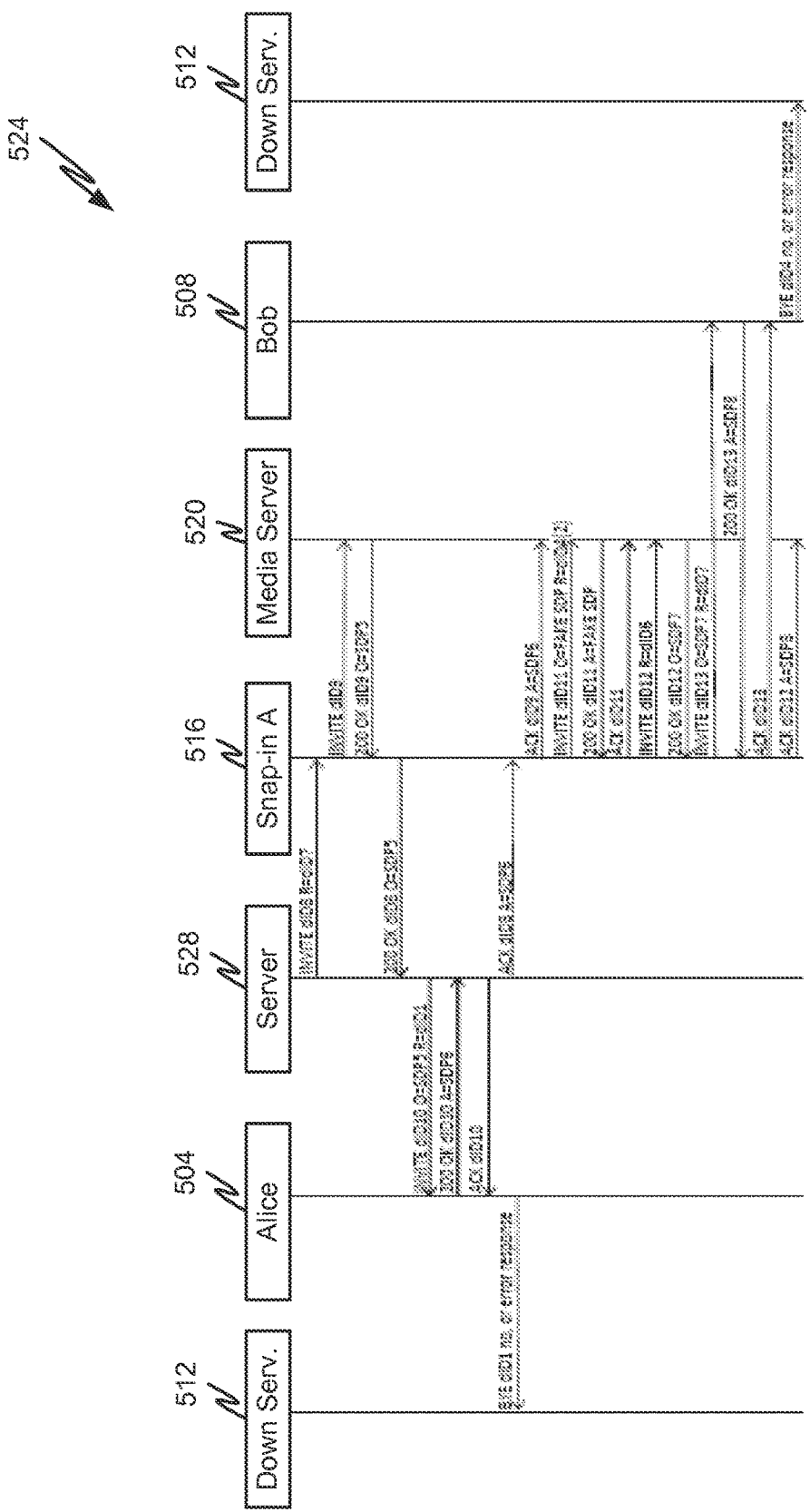
FIG. 5B is a diagram depicting a server-initiated session reconstruction method for the communication session depicted in FIG. 5A.
Figure 5C:
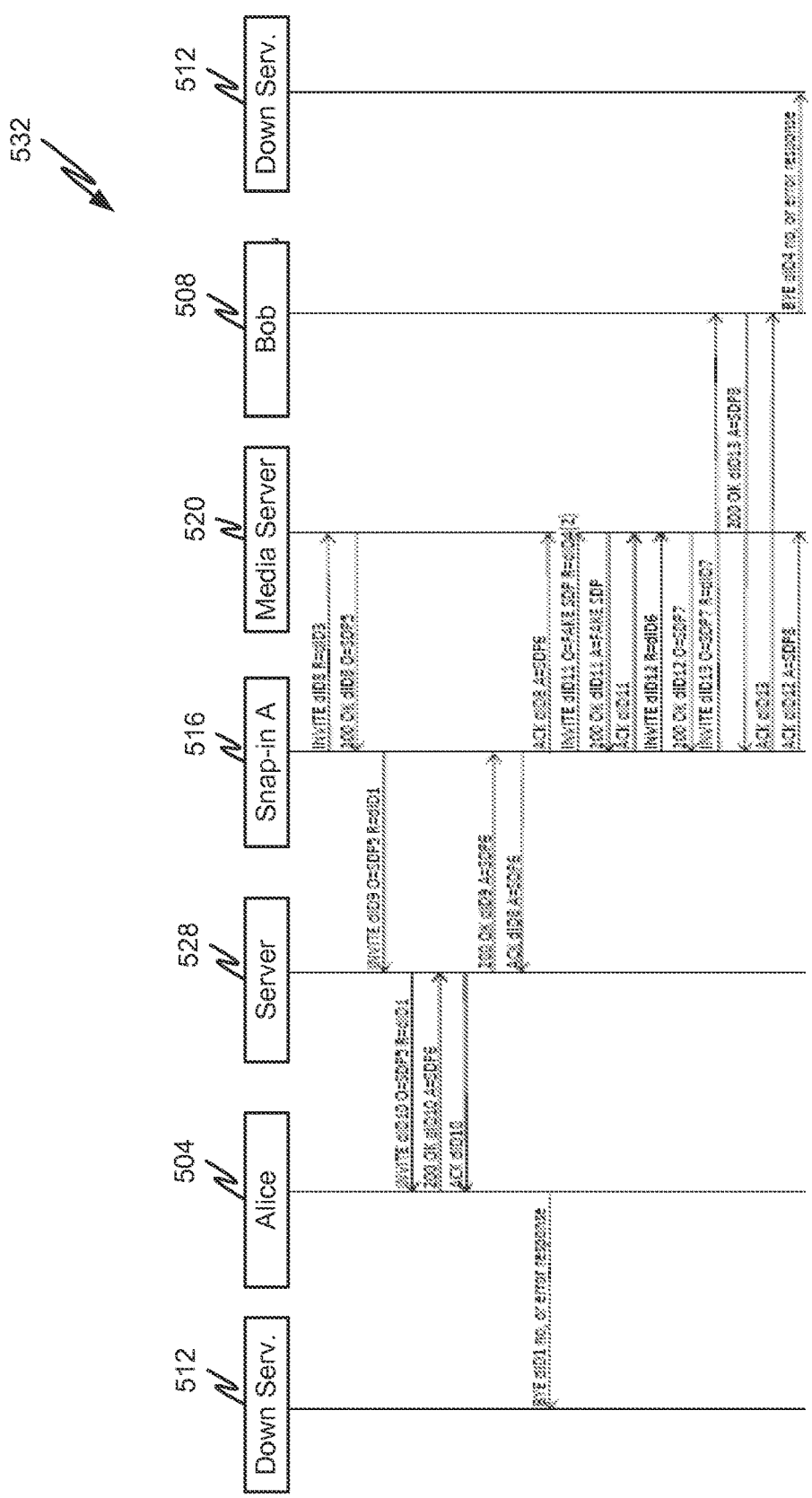
FIG. 5C is a diagram depicting a snap-in-initiated session reconstruction method for the communication session depicted in FIG. 5A.

With reference now to FIGS. 5A-C, a communication session between Alice 504 and Bob 504 with one or more media servers 520 involved in the communication session will be described in accordance with at least some embodiments of the present disclosure. An initial session construction message flow 500 will be described in connection with FIG. 5A. The initial session construction message flow 500 utilizes one or more snap-ins 516 as well as a server 512 and a media server 520. The media server 520 may correspond to call and media control server 128 or some other media server, which may or may not be in a server cluster 112 with other servers. The server 512 may belong to a server cluster 112 with one or more additional servers capable of performing similar or identical functions as server 512.

The message flow 500 begins when Alice 504 calls Bob 508 and transmits an INVITE message toward Bob 508. The INVITE message is shown to include a first dialog ID dID1 as well as an SDP offer containing first SDP information. The INVITE message is first received at server 512, which transmits an INVITE message toward the snap-in 516. The INVITE message received by the snap-in 516 may include the SDP offer transmitted by Alice 504 as well as a second dialog ID dID2. The snap-in 516 then initiates a message exchange with the media server 520 to engage the media server 520 with Alice 504 and Bob 508. The message exchange includes three portions: (1) to setup an RTP connection between Alice 504 and the media server 520; (2) to setup a control channel (no real SDP) for media mixer purposes (thereby allowing Alice 504 and Bob 508 to bridge RTP); and (3) setup an RTP connection between the media server 520 and Bob 508. The REFER message(s) transmitted during the third portion of the media exchange may prompt the media server 520 to send an INVITE message with the SDP offer, which is used by the snap-in 516 in the INVITE transmitted to Bob 508.

It should be appreciated that one or more INFO messages may be transmitted to the media server 520 during the message flow 500, but such messages are not shown for sake of brevity and to help in the understanding of the other messages transmitted in the message flow 500.

With reference now to FIG. 5B, a first message flow 524 for recovering from server 512 failure during a communication session between Alice 504 and Bob 508 will be described in accordance with at least some embodiments of the present disclosure. The first message flow 524 corresponds to a message flow 524 whereby the reconstruction is initiated by the replacement server 528. It should be appreciated that the replacement server 528 may belong to the same server cluster 112 as the now failed server 512. The replacement server 528 may initiate the reconstruction process in response to detecting failure of server 512 or in response to a message transmitted by a managing server 124.

The message flow 524 begins with the replacement server 528 transmitting an INVITE with Replaces to the snap-in 516. The snap-in 516 responds by transmitting an INVITE message to media server 520. The media server 520 responds with a 200 OK message having a new SDP offer. This 200 OK message is received by the snap-in 516 and transmitted to the server 528.

Upon receiving the 200 OK message, the server 528 transmits an INVITE message with the new SDP offer to Alice 504. Alice 504 responds with a 200 OK, which contains an SDP answer to the new SDP offer. Upon receiving the 200 OK message, the server 528 issues an ACK message back to the snap-in 516. Receipt of the ACK message causes the snap-in 516 to begin a message exchange with the media server 520. The snap-in 516 first transmits an ACK message with the new SDP answer. The snap-in then transmits an INVITE with a fake SDP offer (or no SDP offer) and a Replaces header to the media server 520. This fake SDP offer (or no SDP offer) is what causes the control dialog to be taken over. The media server 520 responds to the INVITE message with a 200 OK message having a fake SDP answer (or no SDP answer). The snap-in 516 then transmits an INVITE with Replaces message to the media server 520. Upon receiving the INVITE with Replaces message, the media server 520 responds with a 200 OK message having a new SDP offer. The new SDP offer is then transmitted from the snap-in 516 to Bob 508 in an INVITE with Replaces message. Bob 508 responds to the INVITE with Replaces message with a 200 OK message and a new SDP answer. The snap-in 516 responds to the 200 OK message with an ACK message transmitted to Bob 508 and with another ACK message transmitted to the media server 520. The ACK message transmitted to Bob 508 causes Bob 508 to transmit a BYE message to the now failed server 512. The ACK message transmitted to the media server 520 contains the new SDP answer that was transmitted by Bob 508. At this point Bob 508 and Alice 504 are able to exchange RTP media with one another via the media server 520.

With reference now to FIG. 5C, a second message flow 532 for recovering from server 512 failure during a communication session between Alice 504 and Bob 508 will be described in accordance with at least some embodiments of the present disclosure. The second message flow 532 may be similar to message flow 524 except that the reconstruction is initiated by the snap-in 516 instead of the server 528. It should be appreciated that the replacement server 528 may belong to the same server cluster 112 as the now failed server 512. The replacement server 528 may initiate the reconstruction process in response to detecting failure of server 512 or in response to a message transmitted by a managing server 124.

The message flow 532 begins with the snap-in 516 transmitting an INVITE with Replaces to the media server 520. This causes the media server 520 to respond with a 200 OK message that includes a replacement SDP offer. The information regarding the replacement SDP offer is transmitted from the snap-in 516 to the replacement server 528 in an INVITE with Replaces, where the Replaces header identifies the first dialog ID dID1 to be replaced by a new dialog established with the replacement server 528. The server 528 then exchanges an INVITE with Replaces, 200 OK, and ACK message with Alice 504 to negotiate SDP information with Alice. Thereafter, the replacement server 528 transmits a 200 OK message to the snap-in 516 with a replacement SDP answer that was transmitted by Alice 504 in the 200 OK message during the previous exchange with the media server 528.

The snap-in 516 responds to the 200 OK message by transmitting a first ACK message to the replacement server 528 and a second ACK message to the media server 520. The first ACK message completes the exchange between the snap-in 516 and Alice 504. The second ACK message contains the replacement SDP answer and initiates a new exchange between the snap-in 516 and media server 520. The exchange between the snap-in 516 and media server 520 is similar to the exchange in the message flow 524. After the appropriate exchange of messages between the snap-in 516, media server 520, and Bob 508, Alice 504 and Bob 508 are able to exchange RTP media with one another via the media server 520 and now the replacement server 528 is in control of the session in replacement of the now failed server 512.

Figure 6A:
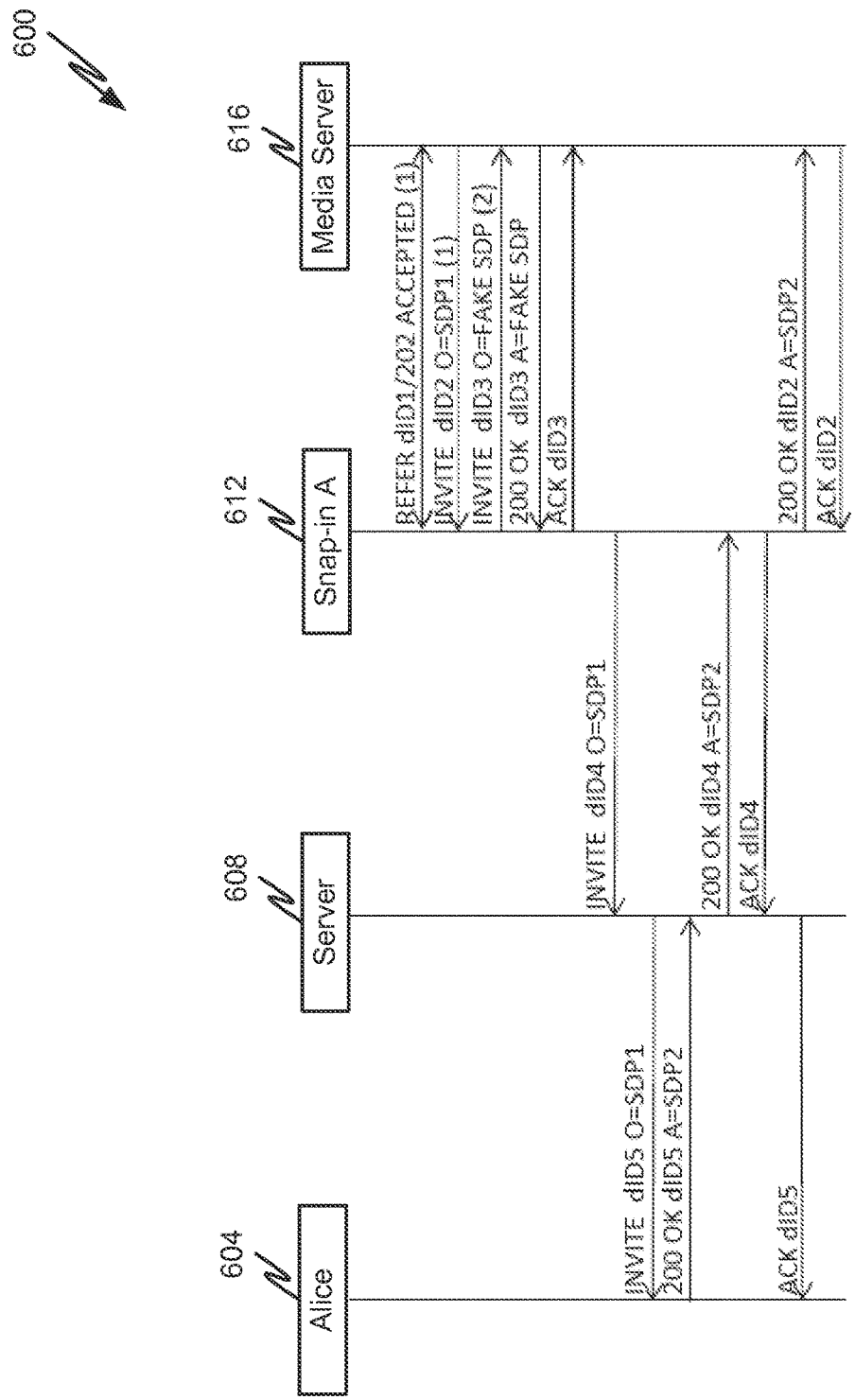
FIG. 6A is a diagram depicting messaging flows for a communication session between Alice and a media server in accordance with embodiments of the present disclosure.
Figure 6B:
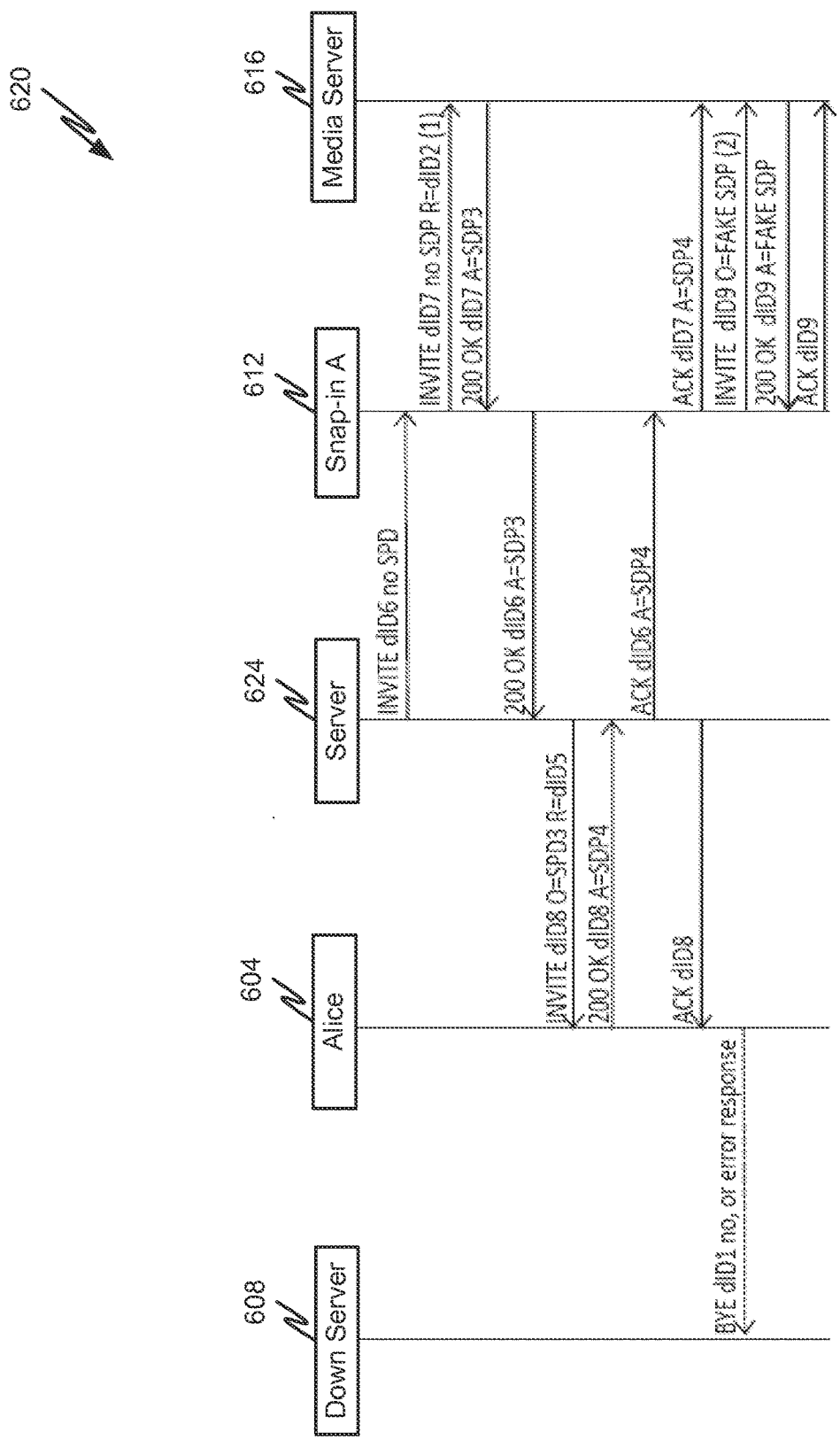
FIG. 6B is a diagram depicting a server-initiated session reconstruction method for the communication session depicted in FIG. 6A.
Figure 6C:
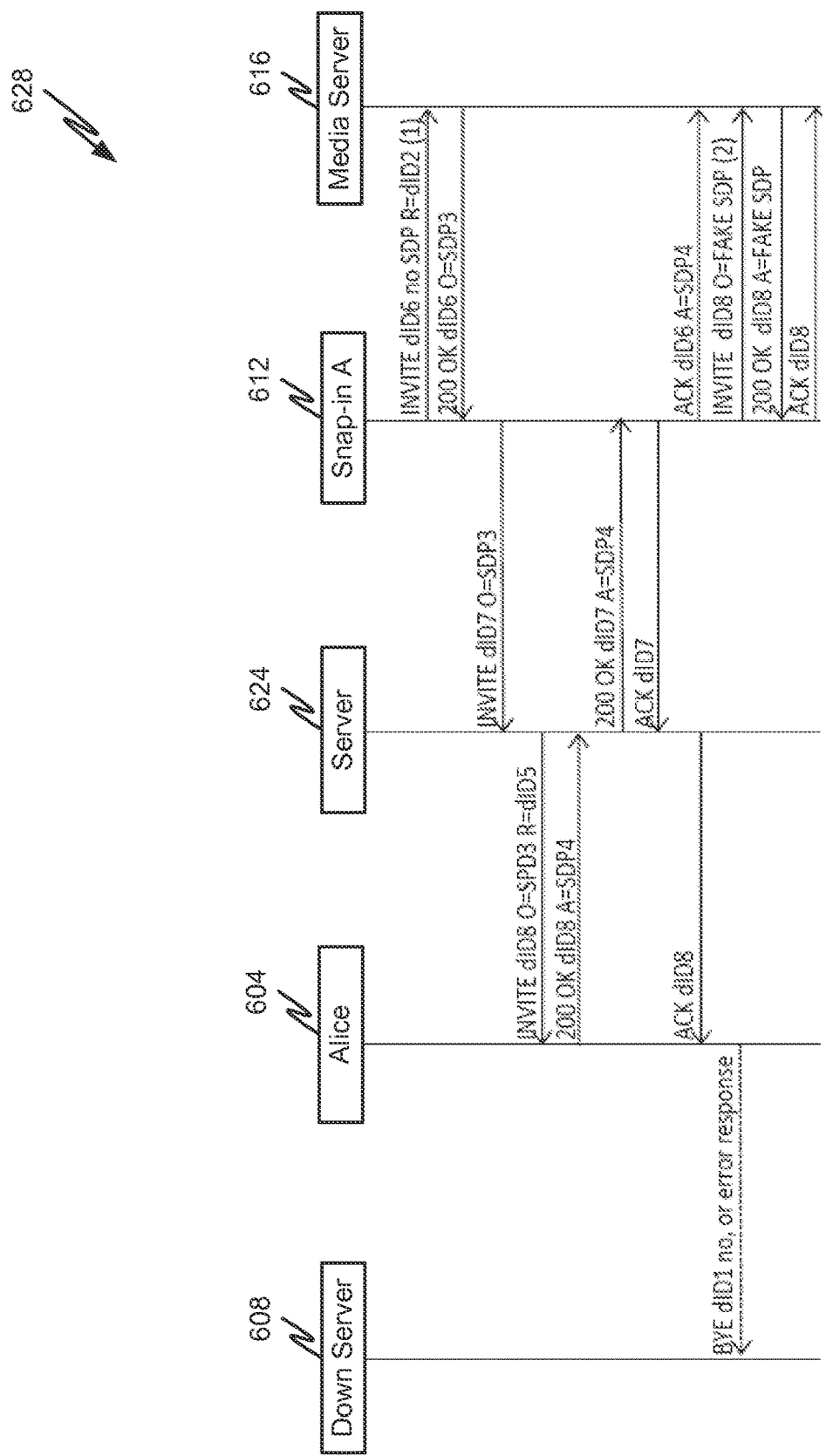
FIG. 6C is a diagram depicting a snap-in-initiated session reconstruction method for the communication session depicted in FIG. 6A.

With reference now to FIGS. 6A-C, a communication session between Alice 504 and a media server 616 (e.g., an IVR session, a voicemail session, etc.) will be described in accordance with at least some embodiments of the present disclosure. An initial session construction message flow 600 will be described in connection with FIG. 6A. The initial session construction message flow 600 utilizes one or more snap-ins 612 as well as a server 608 and a media server 616. The media server 616 may correspond to call and media control server 128 or some other media server, which may or may not be in a server cluster 112 with other servers. The server 608 may belong to a server cluster 112 with one or more additional servers capable of performing similar or identical functions as server 608.

The message flow 600 begins when snap-in 612 and media server 616 have a message exchange that includes two portions: (1) setup of an RTP connection between the media server 616 and Alice 604 and (2) setup of a control channel (with no real SDP) for media mixer purposes, thereby allowing Alice 604 to receive media source by the media server 616 (e.g., an announcement). The first portion of the exchange includes the snap-in 612 transmitting a REFER message to the media server 616, which causes the media server 616 to send and INVITE with an SDP offer. This INVITE and SDP offer is eventually used in an INVITE transmitted to Alice 604 by the snap-in 612.

The second portion of the exchange involves the snap-in 612 transmitting an INVITE to the media server 616 with a fake SDP (or no SDP). The media server 616 responds with a 200 OK message also having a fake SDP (or no SDP). The snap-in 612 then responds with an ACK message.

Meanwhile, the snap-in 612 transmits the INVITE toward Alice 604 through the server 608. This INVITE contains the SDP offer information previously received from the media server 616. When Alice 604 receives the INVITE, Alice 604 responds with a 200 OK message having an SDP answer. The SDP answer is transmitted to the snap-in 612 in a 200 OK message, which causes the snap-in 612 to transmit an ACK back to the server 608 as well as a 200 OK message to the media server 616. The 200 OK message transmitted to the media server 616 contains the SDP answer received from Alice 604. Once all necessary ACKs have been sent a media channel is established between Alice 604 and the media server 616 and the server 608 is included in the control channel between Alice 604 and the media server 616.

With reference now to FIG. 6B, a first message exchange 620 to reconstruct the communication session shown in FIG. 6A will be described in accordance with at least some embodiments of the present disclosure. The first message exchange 620 corresponds to a session reconstruction initiated by the replacement server 624. The replacement server 624 may belong to the same server cluster 112 as the now failed server 608 and may initiate the reconstruction on its own accord (e.g., without receiving an outside instruction) or in response to an instruction received from a managing server 124.

The message flow 620 begins when the replacement server 624 transmits an INVITE message to the snap-in 612. The INVITE message contains no SDP offer and may contain a Replaces header for dID1. The snap-in 612 responds by transmitting an INVITE with Replaces to the media server 616, but still no SDP offer.

The media server 616 responds with a 200 OK message containing an SDP answer (e.g., third SDP information not from the original session). This 200 OK message travels back to the snap-in 612, which transmits the 200 OK message back to the replacement server 624. Upon receiving the 200 OK message, the replacement server 624 transmits an INVITE with Replaces message to Alice 604. The INVITE with Replaces message may include a new SDP offer that substantially matches the SDP information contained in the SDP answer received in the 200 OK message.

Alice 604 responds to the INVITE with Replaces by transmitting a 200 OK message back to the replacement server 624. The 200 OK message transmitted by Alice 604 contains a new SDP answer that is carried back to the media server with an ACK message from the replacement server 624 to the snap-in 612 and then from the snap-in 612 to the media server 616. The replacement server 624 also responds to Alice 604 with an ACK message, which causes Alice 604 to transmit a BYE message to the now failed server 608.

The snap-in 612 then also transmits an INVITE message to the media server 616 with a fake SDP offer (or no SDP offer), to which the media server 616 responds with a 200 OK message also containing a fake SDP answer (or no SDP answer). An ACK is transmitted back by the snap-in 612, thereby completing the message exchange 620.

With reference now to FIG. 6C, a second message exchange 628 to reconstruct the communication session shown in FIG. 6A will be described in accordance with at least some embodiments of the present disclosure. The second message exchange 628 corresponds to a session reconstruction initiated by the snap-in 612 instead of the replacement server 624. The replacement server 624 may belong to the same server cluster 112 as the now failed server 608. The snap-in 612 may initiate the reconstruction on its own accord (e.g., without receiving an outside instruction) or in response to an instruction received from a managing server 124.

The second message exchange 628 begins with the snap-in 612 transmitting an INVITE with Replaces to the media server 616. The INVITE transmitted by the snap-in 612 contains no SDP offer in some embodiments. The media server 616 responds with a 200 OK message containing a new SDP offer. The new SDP offer is carried from the snap-in 612 to the replacement server 624 in an INVITE message. In response to receiving the INVITE message, the replacement server 624 transmits an INVITE with Replaces message to Alice 604, which also contains the new SDP offer transmitted by the media server 616.

Alice 604 responds to the INVITE with Replaces by transmitting a 200 OK message back to the replacement server 624. The INVITE with Replaces message comprises a new SDP answer. The replacement server 624 responds by transmitting a 200 OK message back to the snap-in 612, which also contains the new SDP answer from Alice 604. The snap-in 612 responds by transmitting an ACK message to the replacement server 624 and the media server 616. The replacement server 624 transmits an ACK message to Alice 604, which causes Alice to transmit a BYE message to the now failed server 608.

The snap-in 612 also transmits an ACK message to the media server 616. The ACK message transmitted to the media server 616 also contains the new SDP answer generated by Alice 604. The snap-in 612 then further transmits an INVITE message to the media server 616 that contains a fake SDP offer (or no SDP offer). This causes the media server 616 to respond to the snap-in 612 with a 200 OK message containing a fake SDP answer (or no SDP answer). The snap-in 612 completes the message exchange 628 by transmitting an ACK message back to the media server 616. At this point, the replacement server 624 has taken over the dialog for the now failed server 608.

Figure 7A:
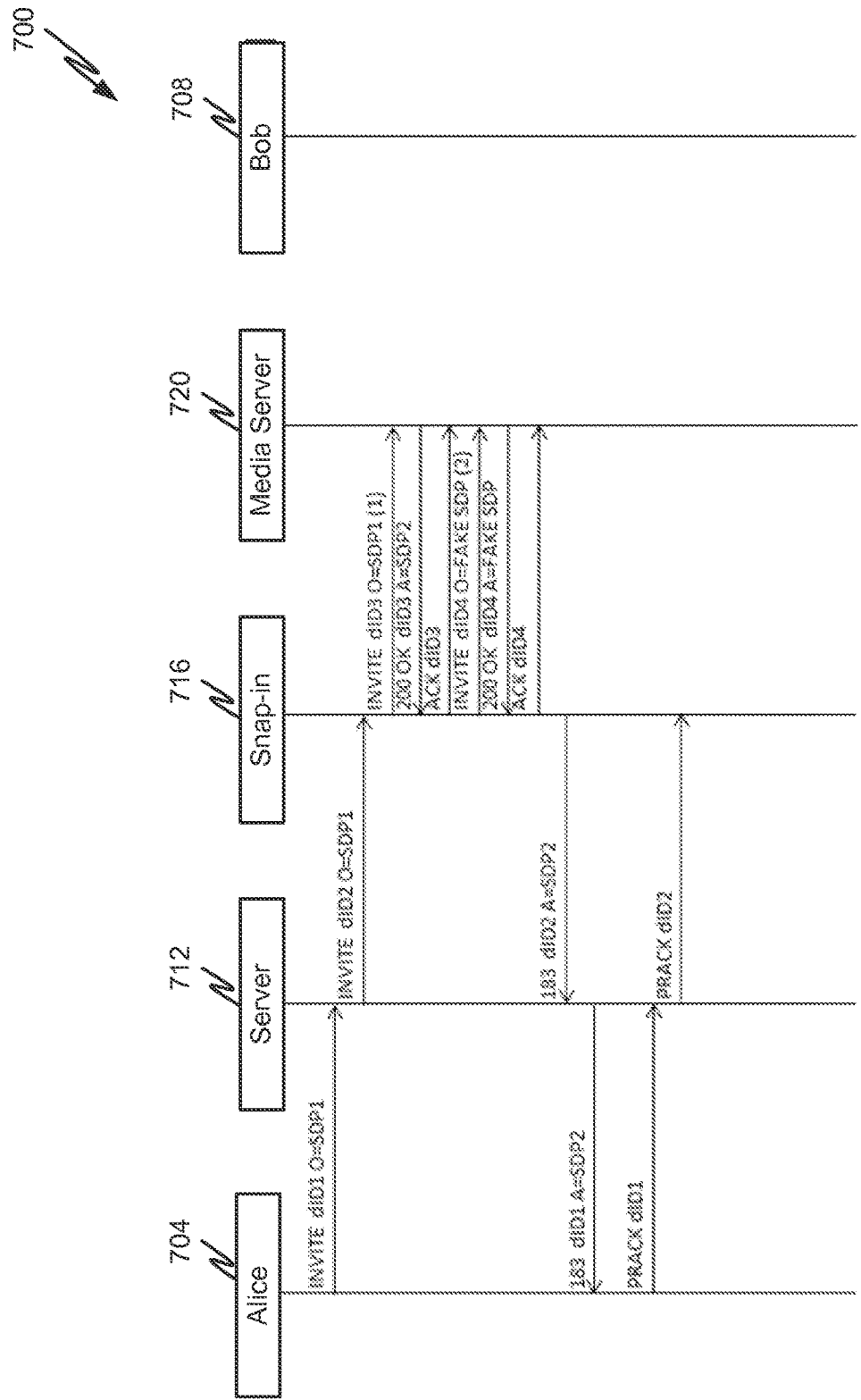
FIG. 7A is a diagram depicting messaging flows for an early media scenario in accordance with embodiments of the present disclosure.
Figure 7B:
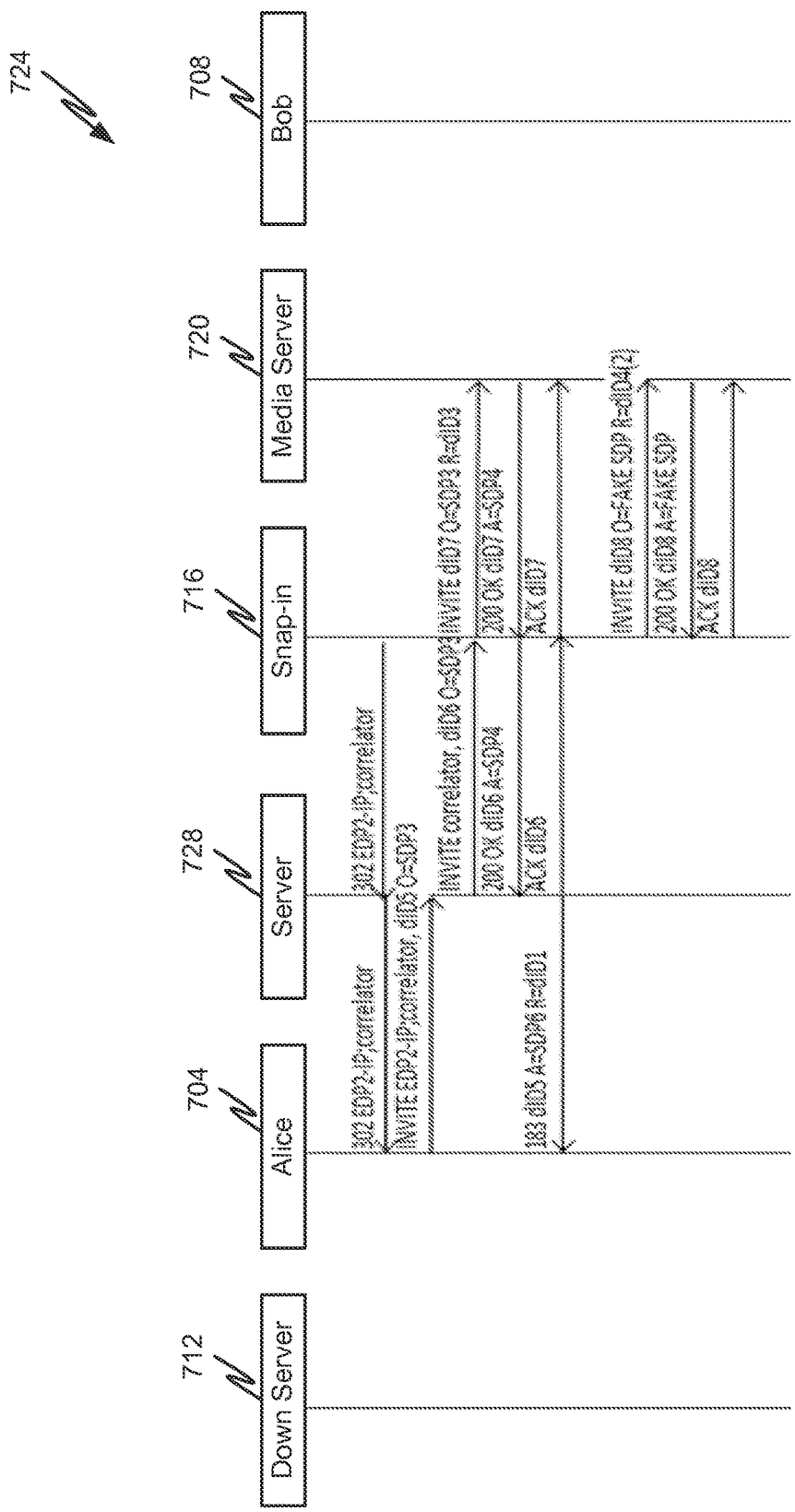
FIG. 7B is a diagram depicting a snap-in initiated session reconstruction method for the communication session depicted in FIG. 7A.

With reference now to FIGS. 7A and 7B, a communication session where Alice 704 calls Bob 708 and is provided with early media (e.g., before Bob 708 answers), will be described in accordance with at least some embodiments of the present disclosure. The session utilizes a server 712, one or more snap-ins 716, and a media server 720. An initial session construction message flow 700 will be described in connection with FIG. 7A. The server 712 may belong to a server cluster 112 with one or more additional servers capable of performing similar or identical functions as server 712.

The message flow 700 begins when Alice 704 transmits an INVITE message toward Bob 708 that contains an initial SDP offer. The INVITE message is first received at server 712, which forwards the INVITE message with the SDP offer to the snap-in 716, which subsequently forwards the INVITE message to the media server 720. Because Bob 708 has not yet answered the call (e.g., picked up the phone), the media server 720 responds to the INVITE with a 200 OK message containing an SDP answer identifying the third dialog ID as the dialog ID to be used between the media server 720 and snap-in 716.

The message flow 700 continues with the snap-in 716 responding with an ACK message and then transmitting a second INVITE message containing a fake SDP offer (or no SDP offer) for media mixer purposes (e.g., to eventually allow Alice 704 and Bob 708 to bridge RTP). The media server 720 responds to the second INVITE message with a second 200 OK message having a fake SDP answer (or no SDP answer), to which the snap-in 716 responds with an ACK message.

The message flow 700 for early media continues with the snap-in 716 transmitting a 183 message to the server 712 that contains an SDP answer to the initial INVITE message transmitted by the server 712. The 183 message also contains a second dialog ID dID2.

The server 712 forward the 183 message to Alice 704, to which Alice 704 responds with a PRACK message. The PRACK message is forwarded to the snap-in 716 by the server 712, thereby completing the message flow 700.

With reference now to FIG. 7B, a message flow 724 for reconstructing the early media session of FIG. 7A will be described in accordance with at least some embodiments of the present disclosure. The message flow 724 is shown as being initiated by the snap-in 716, but it should be appreciated that the reconstruction process can be initiated by a replacement server 728 without departing from the scope of the present disclosure. The message flow 724 begins when the snap-in 716 determines that a server 712 initially involved in the communication session is now failed and a replacement server 728 is needed to support the session. The reconstruction method begins with the snap-in 716 transmitting a 302 message to the replacement server 728. The 302 message uses the original dialog ID as it must be seen by Alice 704 as an in-dialog response to the original INVITE. The Contact URI of the 302 message comprises the address of the new server as well as a correlation ID that allows the new server to associate the new INVITE with the original call.

The new server 728 transmits the 302 message to Alice 704. Alice 704 responds to the 302 message with an INVITE message containing a new SDP offer, a new dialog ID (e.g., a fifth dialog ID dID5) and the correlation ID. The INVITE message is transmitted to the snap-in 716 by the replacement server 728 with the new SDP offer. This causes the snap-in 716 to associate this new INVITE with the original call, and to transmit the INVITE with Replaces message to the media server 720. The INVITE with Replaces message contains an identifier of the dialog to be replaced (e.g., the third dialog ID dID3) along with the new SDP offer initiated by Alice 704.

The media server 720 responds to the INVITE with Replaces message with a 200 OK message containing a new SDP answer. The 200 OK message is forwarded to the replacement server 728. Upon receiving the 200 OK message with the new SDP answer from the media server 720, the replacement server 728 transmits a 183 message with an identifier of the dialog to be replaced in a Replaces header of the message (e.g., the first dialog ID dID1). The 183 message also contains the SDP answer transmitted by the media server 720.

The replacement server 728 also transmits an ACK message back to the snap-in 716, which causes the snap-in 716 to transmit an ACK message back to the media server 720. Thereafter, the snap-in 716 and media server 720 begin the process of setting up a new RTP bridge whereby the snap-in 716 transmits a new INVITE with Replaces message to the media server 720 that contains a fake SDP offer (or no SDP offer). The media server 720 responds with a 200 OK message containing a fake SDP answer (or no SDP answer). Upon receiving the 200 OK message, the snap-in 716 responds with an ACK message and the flow 724 ends.

Figure 8:
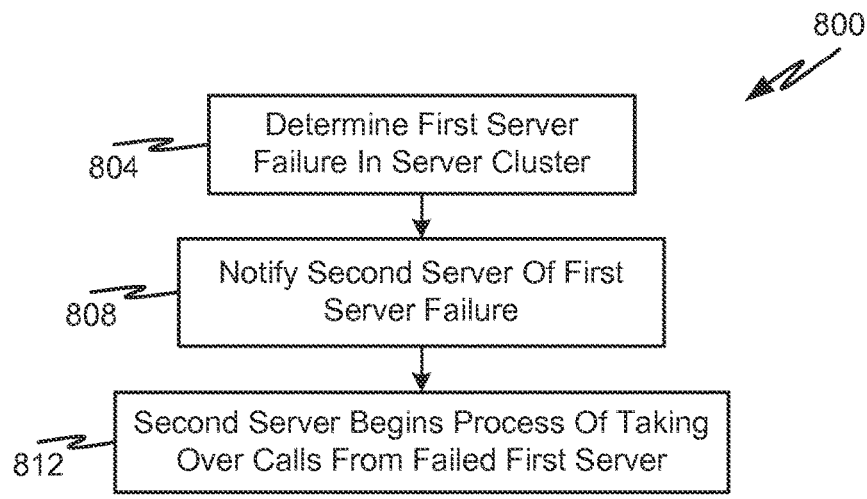
FIG. 8 is a flow chart depicting a method of triggering a server-initiated session reconstruction method in accordance with embodiments of the present disclosure.

With reference now to FIG. 8, details of triggering a server-initiated session reconstruction method 800 will be described in accordance with embodiments of the present disclosure. The method 800 begins when it is determined that a first server from a server cluster 112 has failed (step 804). The determination of server failure may be performed by the managing server 124, another server within the same server cluster 112 as the failed server, or by the failed server sending out a final failure message to its counterparts in the server cluster 112.

If the first server was not currently handling any communication sessions, then the method 800 can end; however, if the first server was handling at least one communication session when it failed, the method 800 proceeds by notifying a second server of the first server's failure (step 808). As noted above, the second server may be notified of the first server's failure by a managing server 124. Alternatively or additionally, the second server may become aware of the first server's failure by sending a ping toward the first server and not receiving a timely response or by receiving a failure message broadcast by the first server to the other servers in the server cluster 112. If the second server is not being directed by the managing server 124, then it may be necessary for the second server to arbitrate with other servers in the server cluster 112 to ensure that only one server in the serve cluster 112 attempts to take-over the sessions for the failed first server. If the second server is being directed by the managing server 124, then it can be assumed that the managing server 124 has already performed the necessary arbitration.

The second server then begins the process of taking over calls and dialogs from the failed first server (step 812). This particular step may vary depending upon the type of sessions that were being supported by the first server. For instance, it will depend whether the first server was handling a call between two or more users, whether the first server was handling a call with a media server involved in the communication session, or whether the first server was handling a call between a user and media server.

Figure 9:
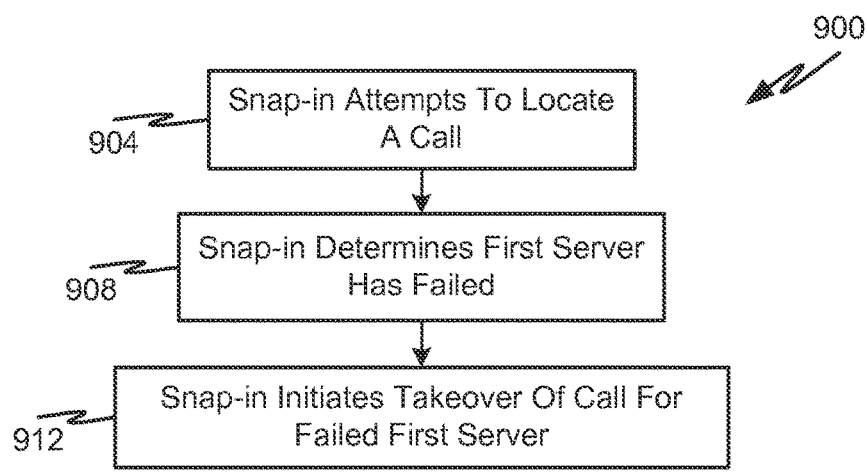
FIG. 9 is a flow chart depicting a method of triggering a snap-in-initiated session reconstruction method in accordance with embodiments of the present disclosure.

With reference now to FIG. 9, details of triggering a snap-in-initiated session reconstruction method 900 will be described in accordance with at least some embodiments of the present disclosure. The method 900 begins when a snap-in attempts to locate a call (step 904). When trying to locate a call, the snap-in may determine that a first server has failed (step 908). This determination may be made because the snap-in cannot receive a response from the first server that was previously handling the call being located by the snap-in.

In response to determining that the first server has failed, the snap-in initiates takeover of the call for the failed first server (step 912). In particular, the snap-in will initiate a message exchange whereby a replacement server is instructed to take over one or more calls previously being handled by the first server.

Figure 10:
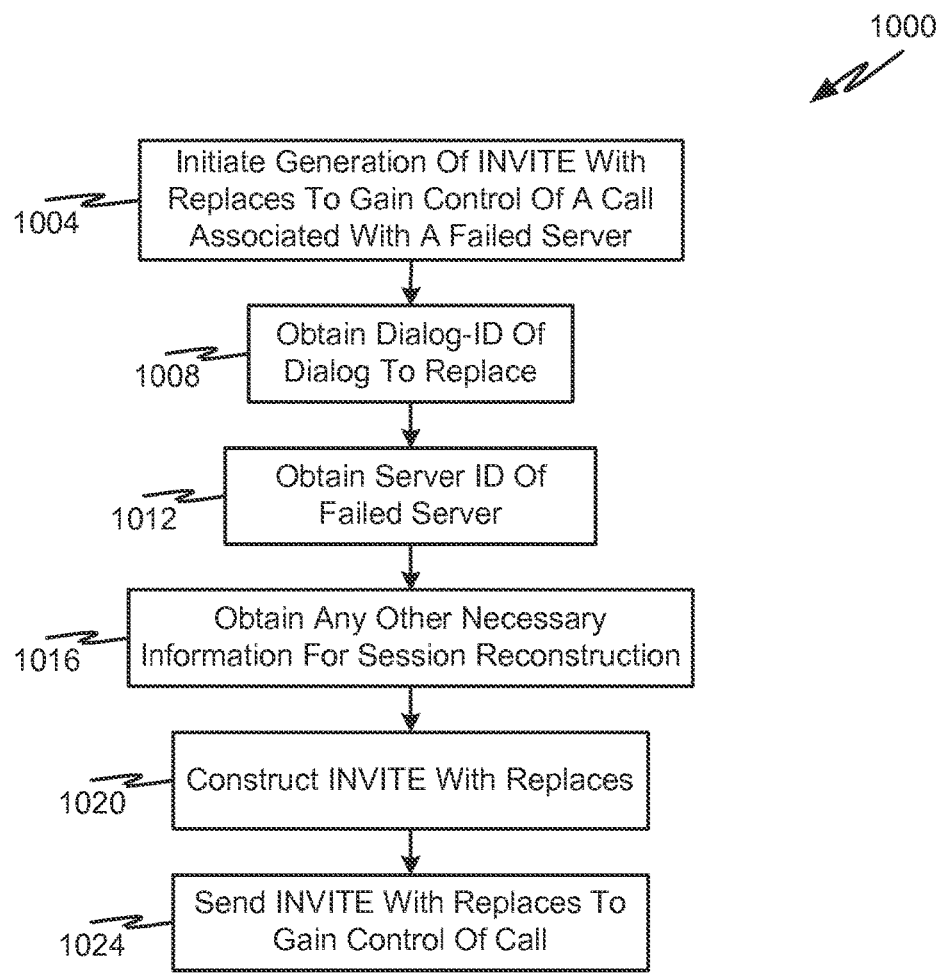
FIG. 10 is a flow chart depicting a method of using an INVITE with Replaces as part of session reconstruction in accordance with embodiments of the present disclosure.

With reference now to FIG. 10, a method 1000 of using an INVITE with Replaces as part of session reconstruction will be described in accordance with embodiments of the present disclosure. It should be appreciated that while the method 1000 will be described in connection with using an INVITE with Replaces, some or all of the steps of the method 1000 can be used in connection with a 3xx message instead of an INVITE with Replaces message. The method 1000 begins with a communication component (e.g., replacement server, snap-in, or endpoint involved in a communication session) initiating the generation an INVITE with Replaces message to gain control of a call associated or previously handled by a failed server (step 1004). The method 1000 continues with the communication component obtaining a dialog ID of the dialog to replace (step 1008). In particular, the dialog ID of the dialog being handled by the now failed server is determined so that the dialog can be replaced with a new dialog on a replacement server.

The method 1000 further continues by obtaining the server ID of the failed server along with any other information that can be used to uniquely identify the failed server either globally or within the server cluster 112 (step 1012). Thereafter, any other necessary information for session reconstruction is obtained by the communication component generating the INVITE with Replaces (step 1016).

Once all of the necessary information has been obtained, the communication component constructs the INVITE with Replaces message (step 1020). The INVITE with Replaces message is then sent to various other communication components involved in the session being reconstructed on the replacement server thereby enabling the replacement server to gain control of the call (step 1024).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
determining that a first server in a server cluster has failed and at least one communication session was under control of the first server when the first server failed;
in response to determining that the first server has failed, initiating a session reconstruction process to enable a replacement server from the server cluster to take over the communication session for the first server, wherein the session reconstruction process comprises:
generating one or more session reconstruction messages, at least one of which includes session reconstruction data therein; and
transmitting the one or more session reconstruction messages to all communication components still involved in the at least one communication session to set up a new communication session that correlates to the at least one communication session.

2. The method of claim 1, wherein the one or more session reconstruction messages comprise a Session Initiation Protocol (SIP) INVITE with Replaces message.

3. The method of claim 2, wherein the SIP INVITE with Replaces message comprises an identifier of a first dialog ID used in the at least one communication session by the first server as well as a new dialog ID to replace the first dialog ID.

4. The method of claim 3, wherein the one or more session reconstruction messages further include at least one Session Description Protocol (SDP) offer to replace an SDP used in the at least one communication session before the first server in the server cluster failed.

5. The method of claim 3, wherein the new dialog ID is included in a Replaces header of the SIP INVITE with Replaces message.

6. The method of claim 1, wherein the one or more session reconstruction messages comprise a Session Initiation Protocol (SIP) 300 or 301 redirect response message.

7. The method of claim 6, wherein the SIP 300 or 301 redirect response message uses an original dialog identifier assigned to the communication session being reconstructed by the replacement server so that a communication component views the SIP 300 or 301 redirect response message as an in-dialog response to a SIP INVITE message and wherein the SIP 300 or 301 redirect response message comprises a Contact Universal Resource Identifier (URI) that includes an address of the replacement server as well as a correlation identifier that allows the replacement server to associate a new SIP INVITE message with the communication session being reconstructed by the replacement server.

8. The method of claim 1, wherein the session reconstruction process is initiated by the replacement server.

9. The method of claim 1, wherein the session reconstruction process is initiated by a snap-in involved in the at least one communication session.

10. The method of claim 1, wherein the at least one communication session included at least one media server and wherein the session reconstruction process further comprises generating at least one of a Session Initiation Protocol (SIP) INVITE message and a SIP REFER message that includes a dummy Session Description Protocol (SDP) offer and transmitting the at least one SIP INVITE message to the at least one media server.

11. A communication system, comprising:
a first server, wherein the first server is in a server cluster including the first server and a second server, the first server being configured to receive an indication that the second server has failed or otherwise become unable to continue servicing at least one call that was previously being serviced by the second server prior to the failure or unavailability of the second server and in response thereto perform a session reconstruction process that includes:
generating a message that contains information enabling the first server to impersonate the second server; and
transmitting the message to a User Agent Client (UAC) involved in the at least one call to initiate, by the UAC, a new session, wherein the information contained in the message enables the new session to have reconstructed session state from the at least one call that was previously being serviced by the second server prior to the failure of the second server.

12. The communication system of claim 11, wherein the session reconstruction process is initiated by the first server.

13. The communication system of claim 11, wherein the session reconstruction process is initiated by a snap-in.

14. The communication system of claim 11, wherein the message comprises a Session Initiation Protocol (SIP) INVITE with Replaces message.

15. The communication system of claim 14, wherein the SIP INVITE with Replaces message comprises an identifier of a first dialog ID used in the at least one call as well as a new dialog ID to replace the first dialog ID.

16. The communication system of claim 15, wherein the message comprises at least one Session Description Protocol (SDP) offer to replace an SDP used in the at least one call.

17. The communication system of claim 15, wherein the new dialog ID is included in a Replaces header of the SIP INVITE with Replaces message.

18. The communication system of claim 11, wherein the at least one call included at least one media server and wherein the session reconstruction process further comprises generating at least one of a Session Initiation Protocol (SIP) INVITE message and a SIP REFER message that includes a dummy Session Description Protocol (SDP) offer and transmitting the at least one SIP INVITE message to the at least one media server.

19. The communication system of claim 11, wherein the message comprises a Session Initiation Protocol (SIP) 300 or 301 redirect response message.

20. A non-transitory computer-readable medium comprising processor-executable instructions, the instructions comprising:
instructions configured to receive an indication that a first server in a server cluster has failed or otherwise become unable to continue servicing at least one call that was previously being serviced by the first server prior to the failure of the first server;
instructions configured to, in response to receiving the indication, cause a second server in the server cluster to generate a message that contains information enabling the second server to impersonate the first server; and
instructions configured to cause the message to be transmitted to a User Agent Client (UAC) to initiate, by the UAC, a new session, wherein the information contained in the message enables the new session to have reconstructed session state from the at least one call that was previously being serviced by the first server prior to the failure of the first server.

21. The computer-readable medium of claim 20, wherein the message comprises a Session Initiation Protocol (SIP) INVITE with Replaces message.

22. The computer-readable medium of claim 21, wherein the SIP INVITE with Replaces message comprises an identifier of a first dialog ID used in the at least one call as well as a new dialog ID to replace the first dialog ID.

23. The computer-readable medium of claim 20, wherein the at least one call included at least one media server and wherein the instruction further include instructions configured to generate at least one of a SIP INVITE message and a SIP REFER message that includes a dummy Session Description Protocol (SDP) offer.

* * * * *